US010937050B2

(12) United States Patent
Monaco et al.

(10) Patent No.: US 10,937,050 B2
(45) Date of Patent: Mar. 2, 2021

(54) POINT-OF-SALE ("POS") SYSTEM INTEGRATING MERCHANT-BASED REWARDS

(71) Applicant: Bank of America Corporation, Charlotte, NC (US)

(72) Inventors: Mark Churchill Monaco, New York, NY (US); Tony England, Tega Cay, SC (US); Matthew D. Murphy, Charlotte, NC (US); David C. Tyrie, Boston, MA (US)

(73) Assignee: Bank of America Corporation, Charlotte, NC (US)

( * ) Notice: Subject to any disclaimer, the term of this patent is extended or adjusted under 35 U.S.C. 154(b) by 375 days.

(21) Appl. No.: 15/977,384

(22) Filed: May 11, 2018

(65) Prior Publication Data

US 2019/0147708 A1 May 16, 2019

Related U.S. Application Data

(60) Provisional application No. 62/586,409, filed on Nov. 15, 2017.

(51) Int. Cl.
*G06Q 20/40* (2012.01)
*G06Q 30/02* (2012.01)
(Continued)

(52) U.S. Cl.
CPC ....... *G06Q 30/0238* (2013.01); *G06Q 20/027* (2013.01); *G06Q 20/065* (2013.01); *G06Q 20/102* (2013.01); *G06Q 20/20* (2013.01); *G06Q 20/202* (2013.01); *G06Q 20/227* (2013.01); *G06Q 20/24* (2013.01); *G06Q 20/387* (2013.01);
(Continued)

(58) Field of Classification Search
CPC ............ G06Q 30/0238; G06Q 20/202; G06Q 20/227; G06Q 30/0234; G06Q 30/0235; G06Q 20/027; G06Q 30/0226; G06Q 20/4016; G06Q 30/0213; G06Q 30/0217; G06Q 30/0233; G06Q 30/0258; G06Q 30/0269; G06Q 20/065; G06Q 20/102; G06Q 20/387; G06Q 20/24; G06Q 20/40; G06Q 20/20; G06Q 50/01; G06Q 20/322;
(Continued)

(56) References Cited

U.S. PATENT DOCUMENTS 7,516,883 B2   4/2009  Hardesty et al.
8,682,791 B2   3/2014  Bies et al.
(Continued)

*Primary Examiner* — Garcia Ade
(74) *Attorney, Agent, or Firm* — Weiss & Arons LLP; Michael A. Springs, Esq.

(57) ABSTRACT

A merchant point-of-sale ("POS") system architecture is provided. Systems and methods are provided for enabling merchant funded rewards at a POS terminal. Systems and methods are provided for tracking customer activity and determining an appropriate merchant funded reward. The POS terminal may determine an appropriate merchant, funded reward based on location and historical customer transaction data. The merchant may offer a custom reward that promotes customer behaviors that are advantageous to the merchant and other transaction participants. A merchant funded rewards program may be configured to drive incremental sales to merchants that participate in the program.

9 Claims, 13 Drawing Sheets

(51) Int. Cl.
*G06Q 20/20* (2012.01)
*H04L 9/06* (2006.01)
*G06Q 20/22* (2012.01)
*G06Q 20/02* (2012.01)
*G07G 1/00* (2006.01)
*G06Q 20/06* (2012.01)
*G06Q 20/10* (2012.01)
*G06Q 20/38* (2012.01)
*G06Q 20/24* (2012.01)
*H04W 4/30* (2018.01)
*G06Q 50/00* (2012.01)

(52) U.S. Cl.
CPC ......... *G06Q 20/40* (2013.01); *G06Q 20/4016* (2013.01); *G06Q 30/0213* (2013.01); *G06Q 30/0217* (2013.01); *G06Q 30/0226* (2013.01); *G06Q 30/0233* (2013.01); *G06Q 30/0234* (2013.01); *G06Q 30/0235* (2013.01); *G06Q 30/0258* (2013.01); *G06Q 30/0269* (2013.01); *G07G 1/0009* (2013.01); *H04L 9/0637* (2013.01); *G06Q 50/01* (2013.01); *H04L 2209/38* (2013.01); *H04W 4/30* (2018.02)

(58) Field of Classification Search
CPC . H04L 9/0637; H04L 2209/38; G07G 1/0009; H04W 4/30
USPC .......................................................... 705/16
See application file for complete search history.

(56) References Cited

U.S. PATENT DOCUMENTS

| | | |
|---|---|---|
| 9,665,879 B2 | 5/2017 | Aloni et al. |
| 9,697,520 B2 | 7/2017 | MacIlwaine et al. |
| 9,818,266 B2 | 11/2017 | Murphy |
| 9,836,743 B2 | 12/2017 | Celikyilmaz et al. |
| 9,846,888 B2 | 12/2017 | Perreault et al. |
| 2009/0222308 A1* | 9/2009 | Zoldi ................. G06Q 20/4016 705/38 |
| 2013/0254009 A1 | 9/2013 | Barr |
| 2014/0214509 A1 | 7/2014 | Lee et al. |
| 2014/0372238 A1 | 12/2014 | Murphy et al. |
| 2015/0254615 A1* | 9/2015 | Karim .................... G06Q 20/40 705/14.27 |
| 2016/0232556 A1 | 8/2016 | Postrel |
| 2017/0017942 A1 | 1/2017 | Nix et al. |
| 2017/0330217 A1 | 11/2017 | Postrel |

\* cited by examiner

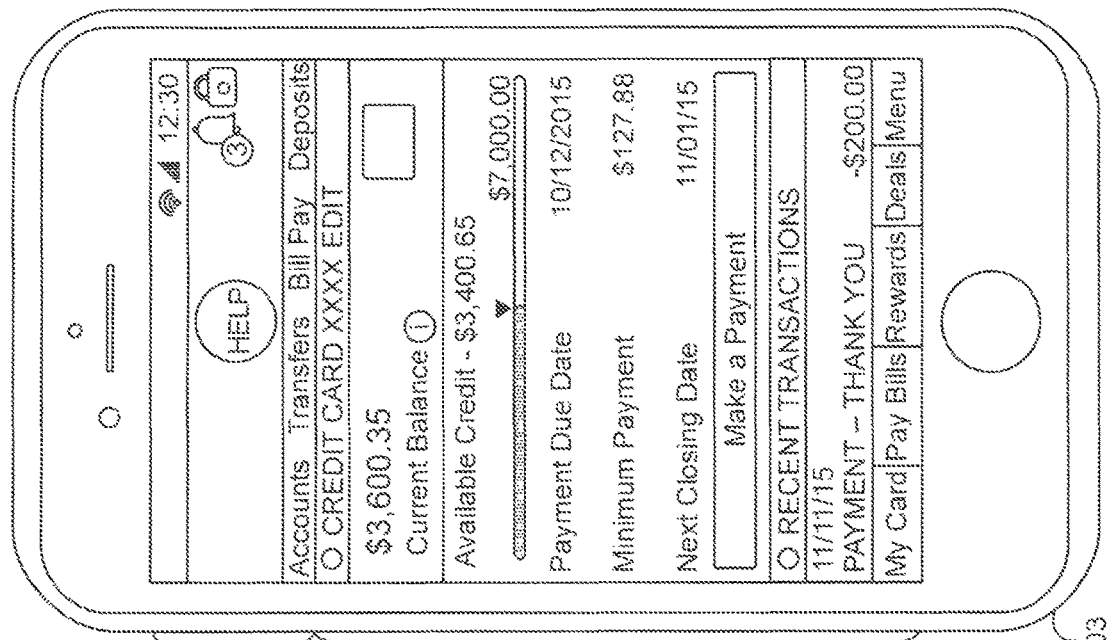
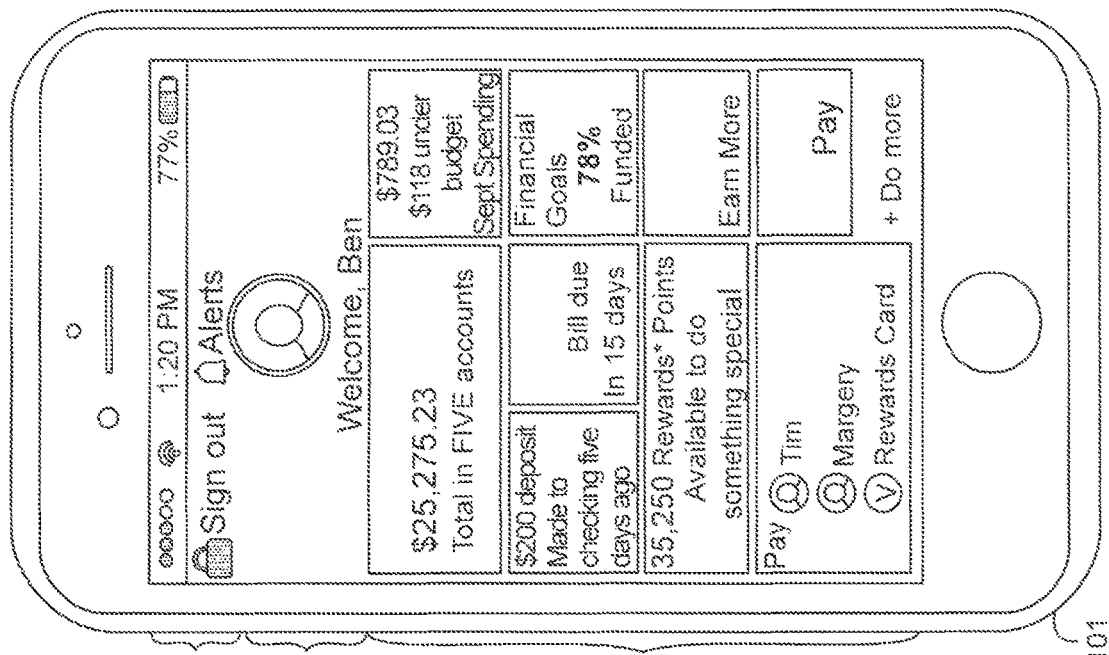
FIG. 1B

POINT-OF-SALE ("POS") SYSTEM INTEGRATING MERCHANT-BASED REWARDS

CROSS-REFERENCE TO RELATED APPLICATION

This application is a non-provisional of U.S. Provisional Patent Application No. 62/586,409 filed Nov. 15, 2017 entitled "CUSTOM REWARDS PROTOCOL AND SYSTEM ARCHITECTURE" which is hereby incorporated by reference herein in its entirety.

FIELD OF TECHNOLOGY

This application relates to point-of-sale ("POS") systems. Specifically, this application relates to hardware and software that provide technological improvements to operation of POS systems in connection with a transaction between two or more transaction participants.

BACKGROUND OF THE DISCLOSURE

In a typical electronic payment scenario, a customer (the "customer") may purchase goods or services ("the product") from a merchant or service provider ("the merchant") using an electronic payment method. An electronic payment method may include a credit transaction, a debit transaction and Automated Clearing House ("ACH") transaction or any suitable electronic payment method. An electronic payment may include debiting an asset account. For example, in a credit transaction, credit may be extended to the customer by an issuing bank (the "issuer"). A debited asset account may reside at the issuer or may be held by another entity.

The customer may initiate a credit, transaction by presenting a payment instrument at a POS terminal of a merchant. Upon capturing the transaction, the merchant may present the transaction to an acquiring bank (the "acquirer"). A transaction processing network may facilitate communication between the merchant and acquirer. The acquirer pays the merchant for (and thus "acquires") the product. A transaction processing network in communication with the issuer and the acquirer settles the transaction between the issuer and the acquirer. The transaction processing network may set transaction processing network fees and collect those fees from the issuer and the acquirer in connection with a settlement process.

Settling the transaction may include the transaction processing network receiving one or more transactions from the acquirer. Each transaction may comprise an amount previously authorized by the issuer. The transaction processing network may debit an account of the issuer for the amount authorized and credit an account of the acquirer the amount, authorized.

Settlement may include a transfer of funds between two or more transaction participants. The transfer may be a "book transfer," an inter-bank transfer or any suitable transfer between transaction participants. A settlement network may transfer the funds between the transaction participants. Illustrative settlement networks may include the Federal Reserve Wire Network ("Fedwire") and other suitable settlement networks that are well known to those of ordinary skill in the art. The settlement network may be any suitable network linking one or more accounts of the transaction participants. The settlement network may be a transaction processing network.

One transaction participant may collect a fee from another transaction participant. The fee may include a point-of-sale terminal rental fee, network fees and any other suitable fees. The fee may be a fixed fee for a transaction. The fee may be a percentage of a transaction. The fee may be a combination of a fixed fee and a percentage of the transaction.

Transaction networks and associated communication pathways are conventionally constructed to transfer fees from the acquirer, through the transaction processing network, to the issuer. For example, the issuer may transfer to the acquirer a purchase amount of the product, net fees. The collected fees may be used by a transaction participant to cover costs associated with the transaction. Exemplary costs may include acquiring credit customers, servicing credit accounts, providing incentives to retain customers, mitigating fraud, covering customer credit risk, group compensation and other expenses.

The acquirer may deduct fees from the amount that the acquirer pays the merchant in exchange for the product. Such a deduction may be called a "merchant discount." The merchant discount may include the acquirer's fee, interchange fee and other expenses.

FIG. 1A shows typical credit transaction flow 100. Flow 100 involves transaction participants such as the merchant, the customer, and the transaction processing network identified below. At step 1, the merchant provides information, relating to a proposed transaction between the merchant and a customer, to a transaction authorization and clearance provider. The transaction authorization and clearance provider may be a transaction processing network. The transaction authorization and clearance provider may provide transaction authorization and clearance information to the merchant. The transaction authorization and clearance information may include authorization from the issuer for the transaction to proceed.

At step 2, the merchant provides $100 in product to the customer. The customer pays with credit. At step 3, the issuer transmits to the customer a statement showing the $100.00 purchase price due. The issuer collects the purchase price amount, along with interest and fees if appropriate, from the customer. At step 4, the issuer routes the $100.00 purchase price amount through the transaction processing network to the acquirer. At step 5, the acquirer partially reimburses the merchant for the purchase price amount. In the example shown in FIG. 1A, the partial reimbursement is $98.00. The difference between the reimbursement amount of $98,00 and the $100.00 purchase price amount is a $2.00 transaction cost.

At step 6, the acquirer transfers a $1.50 interchange amount to the transaction processing network and pays a $0.07 fee to the transaction processing network. At step 1, the issuer transfers $0.05 to the transaction processing network.

TABLE 1

Net positions, by participant, based on transaction flow 100 (shown in FIG. 1A).

| Participant | Net ($) |
| --- | --- |
| Issuer | −0.05 |
| Acquirer | 0.43 |
| Transaction processing network | 1.62 |
| Merchant | −2.00 |
| Customer | 0 |

In transaction flow 100 (shown in FIG. 1A), the transaction fee is based on an exemplary merchant discount rate of 2%. The $1.50 interchange is based on an exemplary interchange rate of 1.5%. The interchange rate is typically set by the transaction processing network. The sum of the transaction processing network fees ($0.07 and $0.05) is based on a total exemplary transaction processing network fee rate of 0.12%.

Transaction processing networks and transaction processing network services are offered under trademarks known to those of ordinary skill in the art. Transaction processing networks may set interchange rates. Issuers may refund or reimburse all and/or a portion of a merchant discount and/or interchange amount. Interchange rates may depend for each transaction processing network on merchant type and size, transaction processing method, transaction volume and other factors.

Credit transactions may be associated with a rewards program. A rewards program may deepen current customer relationships and attract new customers. A reward program, may offer customers incentives to use their payment instruments to purchase goods or services from merchants. Illustrative rewards include perks such as upgrades, cash-back, air lines miles or "points." Points may be utilized to obtain goods or services from qualifying merchants. Customers typically earn points by making qualifying purchases using a payment instrument provided by the issuer.

Typically, rewards programs are funded by the issuer and do not promote merchant specific spend, brand or messages. Merchants pay fees for processing payment instrument payments. Such fees may include fees set by a network that routes transaction between the merchant and issuer. Fees paid by a merchant may be leveraged to compensate an issuer for accepting a credit risk associated with payment instruments and/or compensate an issuer for other costs associated with administering a card program. The issuer may fund rewards or other programs to promote payment instrument usage.

It would be desirable to provide a rewards program model that provides customers with reward-type incentives to use payment instruments, and reduces a magnitude of fees paid by merchants. It would further be desirable to provide a rewards program model, and associated hardware and software, for merchants to control and direct marketing and loyalty of their services, products and/or brand.

However, such a rewards model may disrupt conventional electronic payment system processes, protocols and communication pathways. Furthermore, a conventional implementation of such a rewards program model may exceed strict industry standard timing requirements associated with processing electronic transactions. For example, industry standards may require that not more than 2-3 seconds elapse from a time a customer swipes a payment instrument at a POS terminal until an authorization response is received from the issuer.

Accordingly, it would be desirable to provide a rewards program model, and associated hardware and software, for merchants to control and direct marketing and loyalty of their services, products and/or brand and adhere to the strict timing requirements associated with processing electronic transactions.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which:

FIG. 1B shows illustrative screenshots generated in accordance with principles of the disclosure;

DETAILED DESCRIPTION OF THE DISCLOSURE

Figure 1A:
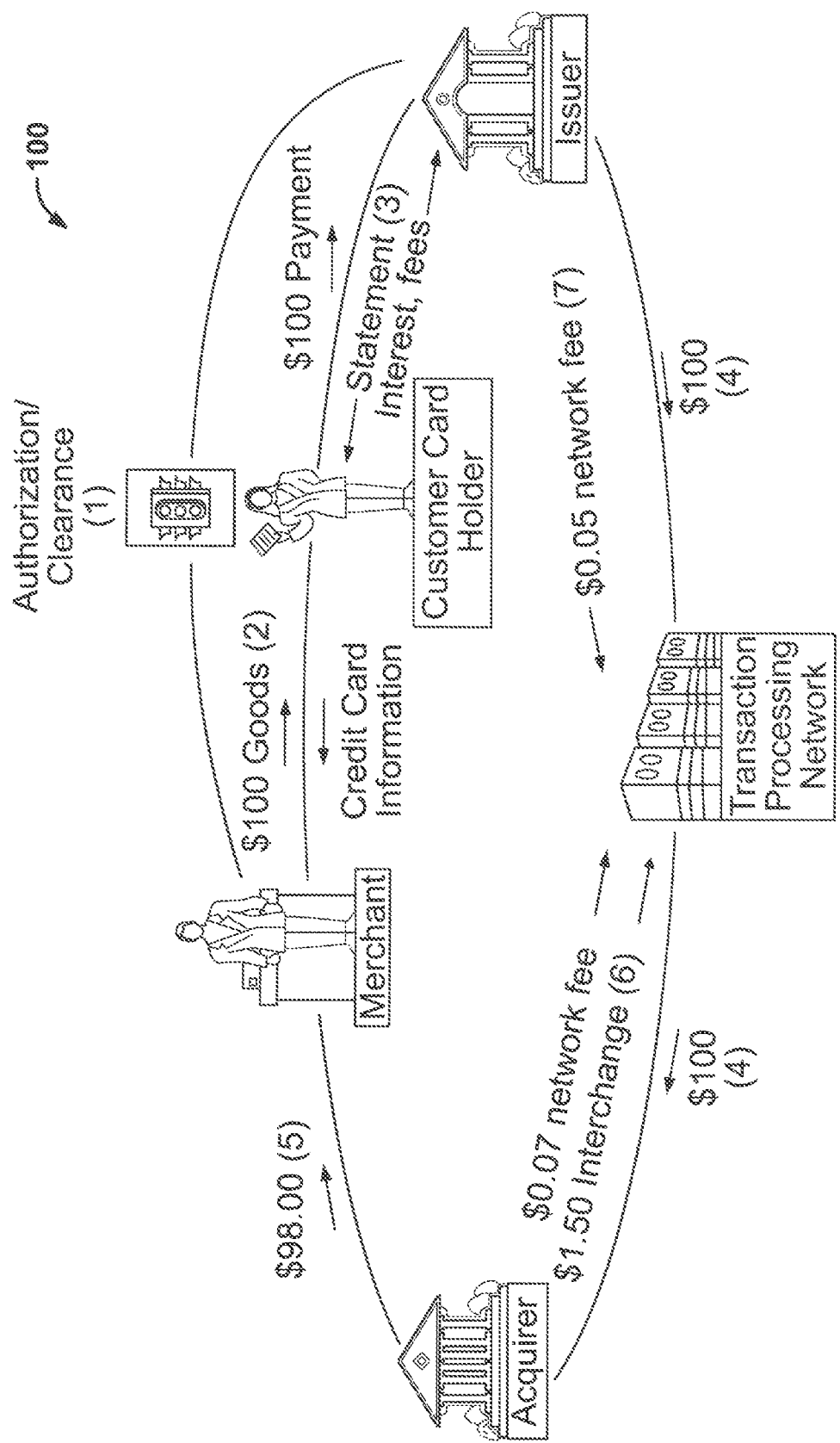
FIG. 1A shows an illustrative system architecture in accordance with principles of the disclosure.

Software, hardware, network protocols and architecture described herein may implement a custom reward program. A custom reward program may include a merchant funded rewards program. A merchant may identify one or more rewards it wishes to make available to its customers. For example, an eatery may offer a free drink after a customer has spent a requisite amount of money at the eatery or has dined a threshold number of times at the eatery. The merchant may strategically identify a reward that provides a larger perceived value than an actual cost or price of the reward.

Custom rewards may be non-monetary such as upgrades, free items, enhanced service and/or preferred service times. Custom, rewards may include monetary rewards such as cash-back or discounts on products. Custom rewards may be provided instantly at a POS, applied as an instant statement credit or accrued and redeemed at specified or selected, times intervals.

A custom reward may be funded by the merchant. In some embodiments, the reward may be jointly funded by the merchant and the issuer. In some embodiments, the merchant may partner with any suitable party to offer and fund a reward or reward program.

In some embodiments, a merchant may provide information about available rewards to the issuer. The issuer may promote the reward to customers (e.g., payment instrument holders). For example, the issuer may display the reward to customers from, within a mobile application ("app") or online banking portal provided to customers by the issuer.

The merchant may promote the available reward. The merchant may promote the reward in its store locations (online or brick and mortar) using any suitable media or medium. The merchant may display the reward to customers from within an app provided to customers by the merchant.

An app running on a mobile device, such as a smart phone, may push notifications to customers regarding available merchant-funded rewards. When the app is provided by a relatively high profile issuer (e.g., an issuer with many more customers than an individual merchant), less visible merchants may be provided access to a top tier mobile app and larger pool of customers than would typically be accessible to the individual merchant.

A merchant may leverage availability of a custom, reward to drive customer traffic to the merchant's locations and products/services. The merchant may leverage the custom reward to drive customer traffic to slower grossing locations. Merchant funding of a reward may, directly or indirectly, promote a payment instrument of the issuer and associated spending on merchant products. The issuer may leverage available custom rewards to drive customers toward specific payment instruments offered, by the issuer and associated with a custom, rewards program.

A customer may be required to affirmatively "opt-in" to a merchant-funded reward. ("MFR") program. The customer may opt-in using an electronic platform provided by the issuer or the merchant.

In response to merchant funding of a reward, the issuer may rebate interchange or other fees for transactions involving customers and/or payment instruments that have opted-in or are otherwise associated with a MFR program. The issuer may provide a rebate to the merchant as a way of passing on savings results from merchant funding of rewards.

Such MFR may increase a volume of payment instrument transactions by enabling and allowing merchants to control a substance of the reward, control marketing associated with promoting the reward and reduce a merchant discount associated with transactions.

Apparatus and methods may include a point-of-sale ("POS") terminal. The POS terminal may be positioned at a merchant location. The POS terminal may be unconventionally programmed. The unconventional programming may implement a MFR program. A MFR program may provide custom rewards to customers. The POS terminal may be unconventionally programmed to implement one or more aspects of a MFR program.

A POS terminal may include a non-transitory computer readable storage media. The POS terminal may include a processor. The media may store a set of executable instructions. The computer executable instructions, when executed by a processor on the POS terminal, may configure the POS terminal to perform one or more unconventional steps.

The executable instructions may configure the POS terminal to capture transaction data associated with a purchase initiated at the POS terminal. The purchase may be initiated by a customer. The customer may initiate the purchase by presenting a payment instrument at the POS terminal to obtain a product or service offered by the merchant. The transaction data may include a plurality of factual attributes.

Factual attributes may be associated with the purchase. Factual attributes may be associated with the presented payment instrument. For example, factual attributes may include an amount of the purchase, a payment instrument, type, geographic location of purchase, type of device used to initiate the purchase, address of customer, a default interchange rate for the transaction and/or a default reward associated with the purchase. Factual attributes may also include a time of purchase, goods/services purchased, weather at the time of the purchase and any other suitable attribute.

Executable instructions may configure the POS terminal to perform specified actions, within a time-sensitive authorization window. A time-sensitive authorization window may begin at a time transaction data is captured by the POS terminal. The time-sensitive authorization window may have a total duration of less than five seconds. For example, a time-sensitive authorization window may have a total duration of three seconds.

Executable instructions may configure the POS terminal to perform one or more actions before submitting transaction data to an issuer computer system for authorization of a purchase amount. Exemplary actions may include activating an attribute prediction model. The attribute prediction model may generate one or more predicted attributes. A predicted attribute may correspond to expected or future purchasing behaviors of a customer. A predicted attribute may correspond to desired or target action of a customer. A target action may include a desired or target purchasing behavior of a customer.

Exemplary predicted attributes may include time a customer is expected to initiate a future purchase, an item expected to be purchased by the customer, an amount the customer will spend in the future and/or where the customer will initiate a future purchase.

The POS terminal may determine a set of machine actions. The set of machine actions may be determined such that, when executed by the POS terminal, they induce target customer behavior. The target customer behavior may yield a plurality of target attributes. The target attributes may be associated with a future purchase. The plurality of target attributes may correspond to an improvement to one or more predicted attribute. The set of machine actions may be determined to achieve one or more of the target and/or predicted attributes.

An exemplary improvement to a predicted attribute may include an improvement in a relationship between two or more transaction participants. For a merchant, exemplary improvements may include an increased sales volume at a lower transaction cost per sale. For a customer, exemplary improvements may include obtaining a desired product at a lower cost.

An improvement to a predicted attribute may include an improvement in a merchant-issuer relationship. For a merchant, an exemplary improvement may include increased sales at a lower merchant discount rate. For the issuer, an exemplary improvement may include increasing a transaction volume of purchases initiated using an issuer-provided payment instrument without increasing the cost to obtain the increased volume.

A machine learning algorithm may recursively learn based on captured transaction data. Based on machine learning, a POS terminal may determine one or more predicted attributes. Based on machine learning, the POS terminal may formulate a target level of customer satisfaction and a cost of obtaining the target level of customer satisfaction.

Based on machine learning, the POS terminal may formulate an appropriate custom reward to achieve the target level of customer satisfaction.

Based on a functionality of the POS terminal that captured the transaction data, the instructions may determine a set of machine actions. The set of machine actions, when executed by the POS terminal, may trigger a threshold number of target customer actions. Target customer actions may correspond to actions that are not capable of being implemented by a machine. Target customer actions may include increased spending at a merchant location or associated with a merchant product. Target customer actions may include increased use of a payment instrument.

Based on capabilities of the POS terminal, the set of target customer actions may be mapped onto the set of machine actions. The set of machine actions may correspond to actions that, are capable of being implemented by the POS terminal. The set of machine actions, when executed by the POS terminal, may be expected to yield, or trigger, one or more of the target customer actions. The set of machine actions, when executed by the POS terminal, may be expected to yield or trigger a threshold number of the target customer actions.

Machine actions may also implement a custom reward program. Machine actions may include presenting a custom reward to a customer. The reward may be presented by altering a display of the POS terminal. The reward may be presented by altering a display of a payment instrument. Illustrative machine actions may include speeding up a checkout process for a customer. Illustrative machine actions may include altering a flow of electronic information over one or more networks.

The POS terminal may perform one or more tasks in parallel. The executable instructions may configure the POS terminal to perform the set of machine actions. When the POS terminal performs the set of machine actions, the POS terminal may also submit captured transaction data to the issuer computer system. The POS terminal may submit the captured transaction data to the issuer computer system for authorization and, in parallel, transmit confirmation to the issuer system that the set of machine actions have been, or will be, performed by the POS terminal.

The executable instructions may configure the POS terminal to track captured transaction data and associated factual attributes. Captured factual attributes may correspond to customer actions. The captured factual attributes may indicate an effect of one or more machine actions (performed by the POS terminal) on customer behavior. The POS terminal may track captured factual attributes over time. The POS terminal may track factual attributes captured at a specific geographic location. The POS terminal may track captured factual attributes captured by one or more other POS terminals.

Based on tracking captured factual attributes, the POS terminal may determine success of achieving at least one target attribute. Based on the level of success, in response to capturing transaction data associated with a future purchase, the POS terminal may adjust one or more target customer actions.

For example, the POS terminal may determine that the set of machine actions have not achieved a target customer action. In response to such a determination, the POS terminal may adjust the set of target customer actions. The adjustment to the target customer actions may change the target goal embodied in the set of machine actions. An adjustment to set of machine actions may trigger a corresponding adjustment to the target customer actions. The POS terminal may adjust the set of machine actions. For example, the POS terminal may reassess how to achieve target customer actions based on the functionality of the POS terminal.

In some embodiments, the POS terminal may determine that a set of machine actions has succeeded in achieving one or more target attributes. In some embodiments, the POS terminal may not make changes to target customer actions.

A set of machine actions may be determined based on an expected or actual economic adjustment to a merchant discount. An economic adjustment to the merchant discount may include a real-time rebate of a fee paid by the merchant for a transaction. An economic adjustment to the merchant discount may include a post-transaction rebate or adjustment. The adjustment may include a combination of a real-time determination and post-transaction adjustment.

A POS terminal may be configured to adjust the merchant discount based on implementing one or other actions included a set of machine actions. The adjustment may correspond to a reduction/rebate in any fee-component of the merchant discount. A fee reduction may be implemented by providing a rebate.

For example, the set of machine actions implemented at the POS terminal may include associating a merchant-funded custom reward with plurality of predicted transaction attributes. The POS terminal may inform the customer that the custom reward has been associated with the predicted attributes. Informing the customer may increase a likelihood that the POS terminal will capture the predicted attributes.

The POS terminal may determine a custom reward such that the custom reward is exclusively linked to one or more products or services offered at a merchant location. The POS terminal may determine a custom reward such that a value of the custom reward is at least as great as a value of an economic adjustment to the merchant discount. A value of the custom reward may be greater than the value of the economic adjustment to the merchant discount.

An economic adjustment to the merchant discount may occur before a POS terminal executes the set of machine actions. Implementing the economic adjustment before executing the machine actions may allow a MFR program to be implemented within a strict time frame associated with electronic payment processing. For example, the POS terminal may process a transaction based on an expected reduction in a fee associated with a captured transaction. The expected reduction in the fee may be based on an expected custom reward that will be provided by the POS terminal at a future date on a future purchase.

The POS terminal may provide a custom reward by speeding up processing of a future purchase. For example, the merchant may obtain pre-approval for a future purchase amount and/or product. The merchant may prepare products expected to be purchased by the customer for pickup. The merchant may prepare products in response to determining that a customer is expected to desire the products. The determination may be based on tracking customer purchasing activity. A custom reward may include providing a customer prioritized service. Prioritized service may include directing the customer to special checkout lanes or concierge type service. The special checkout lane may provide less wait time than a typical checkout lane at a specific merchant location.

A custom reward may include providing a customer a bonus product when the POS terminal captures a future purchase. The bonus product may be determined based on a product expected to be desired by the customer. The bonus product may be determined based on a value of an expected purchase. The bonus product may be a product previously purchased by the customer.

The POS terminal may be configured to identify the bonus product based on proximity of the bonus product, within the merchant location, to a POS terminal that captures the future purchase. The identity of the bonus product may be determined in real time in response to capturing a future purchase. For example, the bonus product, may include an item displayed within five feet of the POS terminal that captures a purchase.

A POS terminal may be one of a plurality of POS terminals in operation at a merchant location. The attribute prediction model may be configured to determine a threshold number of target factual attributes based on transaction data captured by each of the plurality of POS terminals.

A merchant location may include a plurality of POS terminals. Each of the plurality of POS terminals may include its own attribute prediction model. A locally executing attribute prediction model may speed up transaction processing at each POS terminal. A locally executing attribute prediction model of each POS terminal may track purchased executed by each of the other POS terminals.

The set of machine actions may be determined by a first POS terminal and executed by a second POS terminal. For example, the set of machine actions may include offering a custom reward. The custom reward may be determined by the first. POS terminal at a time the first POS terminal captures transaction data. The first POS terminal may determine that the custom, reward, is most, likely to achieve the target customer action if offered at the second POS terminal. The first POS terminal may determine any suitable attribute of the custom, reward. Illustrative attributes may include a substance of the custom reward, a time when the custom reward will be offered and a location where the custom reward will be offered.

The first POS terminal may inform a customer of their eligibility for the custom reward leveraging one or more components (e.g., screen or keypad) of a second POS terminal. The second POS terminal may be at a different geographic location from the geographic location of the first POS terminal. The first POS terminal may coordinate implementation of a custom reward with the second POS terminal.

For example, a POS terminal at a first merchant location may determine a custom reward and that the custom reward may be most effective when offered in a specific geographic location at a specific time. The geographic location may not be the same location as the POS terminal that captured the initial transaction data. The custom reward may be offered to the customer when a purchase is completed at a later time in a different location using a different POS terminal.

A machine learning algorithm may determine a custom reward that, based on machine learning, is expected deepen a customer relationship and attract new customers. The machine learning may learn based on historical transaction data. Historical transaction data may include transaction data captured by one or more POS terminals. The historical transaction data may include transaction data associated with a specific customer, specific payment instrument, specific location, specific product or any suitable attribute.

The machine learning algorithm, may learn based on differences between future transaction data expected, to be captured by a POS terminal and transaction data actually captured by the POS terminal. A machine learning algorithm may determine a predicted attribute that is specific to a POS terminal. For example, the machine learning algorithm may determine a predicted attribute for a POS terminal positioned at an "express checkout" lane or "self-serve" checkout lane.

Apparatus for an electronic payment processing system are provided. The electronic payment processing system may include a POS system. The POS system may include a POS terminal. The POS system may include a rewards-tracking computer system. The rewards tracking computer system may be embedded or otherwise integrated into a POS terminal. The POS system may include a POS controller. The electronic payment processing system may include a rewards-tracking computer system. The electronic payment processing system may include an issuer computer system.

The POS system may include network and communication pathways linking system components. The POS system may include protocols for transferring electronic information over the network and associated communication pathways.

The electronic payment processing system may include a default transaction processing network. The default transaction processing network may link the issuer computer system to the POS computer system. The electronic payment processing system, may include an alternative or bypass transaction processing network. The alternative transaction processing network may link the issuer computer system to the POS computer system.

The POS system may be configured to capture payment instrument information stored on a payment instrument. For example, the POS terminal may capture the payment instrument information when a customer presents the payment instrument to complete a purchase. In response to capturing the payment instrument information, the POS system may be configured to in parallel, (1) transmit the payment instrument information via the default transaction processing network to the issuer computer system and (2) transmit the payment instrument information to the rewards-tracking computer system.

Transmitting information in parallel may reduce an amount of time needed for the electronic payment processing system to process a transaction. Transmitting information in parallel may require unconventional hardware and software to be deployed within components of the electronic payment processing system. Transmitting information in parallel, and subsequent parallel processing of the transmitted information, may ensure that processing a transaction does not exceed strict timing requirements associated with conventional processing of electronic payments.

In response to receiving the payment instrument information, the rewards-tracking computer system may determine whether the payment instrument is associated with a custom rewards program. When the payment instrument is associated with a custom rewards program, the electronic payment processing system may reduce a fee associated with the transaction.

The rewards-tracking computer system, may formulate a set of machine executable actions. The set of machine executable actions may be executable by a component of the POS system, such as the POS terminal. The set of machine executable actions, when executed, may implement a custom rewards program. The rewards-tracking computer system may formulate the set of machine executable actions based on a functionality of the POS terminal that captured the payment instrument information. The rewards-tracking computer system may formulate the set of machine executable actions based on a functionality of a POS terminal that is expected to present a custom reward to the customer.

The rewards-tracking computer system may transmit captured payment instrument information to the issuer computer system. In response to receiving payment instrument information, the issuer computer system may initiate an authorization process for the payment instrument information. The issuer computer system may provide output (e.g., an authorization decision) of the authorization process to the POS system. The output provided to the POS system may correspond to approval or rejection of a purchase.

The reward-tracking computer system may communicate with the issuer computer system using the default transaction processing network. The default transaction processing network may link the issuer computer system to the reward-tracking computer system. The default transaction processing network may link the issuer computer system to the POS terminal. Fees charged for transmitting information on the default transaction processing network may be higher than fees charged for transmitting information using the alternative transaction processing network.

In response to receiving an authorization decision from the issuer computer system, the POS system may trigger execution of the set of actions at the POS terminal. The set of actions, when executed at the POS terminal may implement a custom rewards program.

For example, the set of actions may present a custom reward to an owner of the payment instrument. The owner of the payment instrument may be the customer. The custom reward may be presented to the owner at a POS terminal. The custom reward may be presented to the owner via a mobile device or the payment instrument itself (e.g., the payment instrument includes a screen or display). The set of actions may inform, an owner of the payment instrument that they are eligible for a custom reward when they initiate a future purchase.

The POS system may submit the set of actions executed by the POS terminal to the issuer computer system. The set of actions may be transmitted to the issuer computer system via the alternative transaction processing network. The issuer computer system may not impose a fee for providing the authorization decision to the POS system.

When the issuer computer system receives the set of actions executed by the POS terminal, the issuer computer system may apply an economic adjustment that offsets a merchant discount. An interchange fee may be set by a transaction processing network and passed on to the merchant by the acquirer. The adjustment may reduce a magnitude of the merchant discount. A magnitude of the economic adjustment may be based on the set of actions and how many times the set of action has been executed, or will be executed, by the POS system.

In some embodiments, the issuer computer system may implement the economic adjustment in response to receiving the set of actions that has been formulated and is expected to be executed by the POS system. In some embodiments, the issuer computer system may implement the economic adjustment in response to receiving confirmation that the set of actions has been formulated and/or executed by the POS system. The issuer computer system, may implement the economic adjustment before transmitting an authorization decision to the POS system. Allowing the economic adjustment to occur prior to transmitting the authorization decision may enable a custom rewards program model to operate within strict industry standard timing requirements associated with processing electronic transactions.

The default transaction processing network may include a first communication path-way. The first communication pathway may have a first bandwidth. The alternative transaction processing network may include a second communication pathway. The second communication pathway may have a second bandwidth. The first bandwidth may be an order of magnitude greater than the second bandwidth.

Information transmitted on the first communication pathway may reach a destination faster than information transmitted on the second communication pathway. The first communication pathway may carry a greater quantity of information than the second communication pathway. An entity responsible for maintaining the first communication pathway may charge relatively higher fees to transmit information using the first communication pathway.

The default transaction processing network may be configured to move data between the issuer computer system and the POS system within a first time-window. The alternative transaction processing network may be configured to move data between the issuer computer system and the POS system within a second time-window. The first time-window may be an order of magnitude smaller than the second time-window. Methods described herein may implement a rewards program, model using the less expensive second, communication pathway without exceeding strict industry standard timing requirements associated with processing electronic transactions.

The set of actions executed by the POS terminal may correspond to linking a custom reward determined by the rewards-tracking computer to a payment instrument. The POS system may track earning and spending of custom rewards linked to the payment instrument. The set of actions formulated by the rewards-tracking computer may correspond to providing a custom reward configured to have a value greater than or equal to an economic adjustment provided, by the issuer computer system.

Methods for tracking custom rewards provided at a point-of-sale ("POS") terminal are provided. The POS terminal may be positioned at a merchant location. Methods may include capturing a plurality of transactions initiated at the POS terminal.

Methods include, for each captured transaction, determining whether a captured transaction is eligible for a custom reward provided to a customer that initiated the transaction. Methods may include, for each captured transaction, determining an economic adjustment associated with the custom, reward.

An economic adjustment may impact a merchant discount. For example, an economic adjustment may correspond to a reduction in any fee-component of the merchant discount. The issuer may rebate a fee-component in response to the merchant providing the custom reward to a customer.

Methods may include tracking custom rewards and economic adjustments associated with the merchant location. Methods may include tracking custom rewards redeemed by customers at the merchant locations. POS terminals at the merchant location may present custom rewards and track customer redemption of the presented custom rewards.

Methods may include adjusting a custom reward presented at the merchant location. For example, the reward-tracking computer may monitor an efficacy of custom rewards presented at the merchant location. The rewards-tracking computer may generate alternative custom rewards in response to customer actions. Custom rewards may be altered in response to detecting that, a threshold number of custom, rewards have been offered/redeemed, at a merchant location within a predetermined time period.

For example, if custom rewards offered at a merchant location are not achieving a desired increase in sales volumes or other target customer action, the rewards-tracking computer may attempt to generate alternative custom rewards that will achieve the desired target customer action. The rewards-tracking computer may generate alternative custom rewards based on an inventory of goods/services available at a merchant location.

Methods may include altering the economic adjustment. An economic adjustment may be provided by the issuer computer system. The economic adjustment may be provided and/or altered in response to an increase or decrease in payment instrument usage. A change in payment instrument usage may be detected by the issuer computer system. A change in payment instrument usage may be detected by the POS system.

For example, if at a merchant location, usage of payment instruments enrolled in a custom rewards program increases, the issuer computer system may increase a rebate amount of a fee paid by the merchant for the specific merchant location. A magnitude of an economic adjustment for a merchant location may be determined based on to a threshold number of custom rewards having been offered and/or redeemed at the merchant location within a predetermined time period.

A custom reward may include providing the customer a bonus product offered for sale at the merchant location. The bonus product may be offered to customer gratis. The bonus product may be configured to have a retail value that is greater than a value of the reduction/rebate provided by the issuer computer system for a merchant location.

Aspects of the disclosure relate to providing apparatus and methods for electronic payment systems that allow credit, debit and/or ACE payments to be leveraged to accrue MFR without disrupting strict timing requirements associated with the processing of such payments at the point-of-sale. Apparatus and method disclosed herein may include hardware and software that disrupt conventional processes for processing electronic payments such that additional processes may be performed in the same amount of time as conventional processing.

In certain embodiments, methods may include executing a part or all of a transaction within a predetermined timeframe. In an exemplary embodiment, authorization of a credit transaction may be completed within a suitable amount of time from when a customer initiates a credit transaction with a linked payment instrument at a qualifying POS terminal. The suitable amount of time may be 3, 4, 5, 6 or 7 seconds. The suitable amount of time may be any amount of time after which a customer may become impatient.

Reward programs may be associated with credit and/or debit payment instruments. Such payment instruments may include credit cards, debit cards, instruments or devices that include a chip, such as an ISO14443-compliant contactless chip, or other electronic purchasing devices such as smart phones or tablets (collectively hereinafter, payment instruments). Payment instruments may include payment instrument information stored on a mobile device (e.g., smart phone) or accessible via a mobile device. Illustrative payment instrument information is shown below in Table 2.

TABLE 2

Illustrative Payment Instrument Information

Issuer
Transaction network
Customer name
Expiration date
Card security code ("CSC")
Card verification data ("CVD")
Card verification value ("CVV," "CVV2," "iCVV" or "Dynamic CVV")
Card verification value code ("CVVC")
Card verification code ("CVC" or "CVC2")
Verification code ("V-code")
Card code verification ("CCV")
Signature panel code ("SPC")
Customer identification number ("CID")
Card account number
Brand
Rewards Program ID
Affinity A custom rewards model, while novel and innovative, may be associated with a disruption of traditional electronic payment system architecture.

For example, under the new merchant funded rewards paradigm, functionality may be required for a customer to choose between standard card reward (e.g., issuer funded rewards) or a merchant funded reward available from a participating merchant. Functionality would also need to be provided to allow coordination between the issuer and merchant for determining eligibility for rewards and tracking when a reward has been paid out to a customer.

Such functionality may allow a customer (using a payment instrument) to receive regular product rewards if a merchant funded reward is not selected or receive regular product rewards if the customer makes a purchase from a merchant that does not participate in the merchant funded rewards program.

The merchant funded rewards paradigm may yield lower merchant discount rates (for the merchant) on purchases associated with activated cards (e.g., customers that have opted-in to a specific reward program offered by the merchant). The paradigm may convert savings on merchant costs into directed marketing benefits that may increase sales volume of the merchant.

Issuers may also derive benefits from partnering with the merchant's promotion of the reward. For example, merchant efforts to promote the rewards also promote the brand, loyalty and purchasing behavior associated with the issuer's payment instrument. Such a relationship may provide an economic model that promotes mutually beneficial growth and value.

The customer may also benefit from, a merchant funded reward paradigm. For example, the customer may obtain a reward of greater value (actual or perceived) when the customer selects or "opts-in" to the merchant funded reward. The customer may also be able to select rewards that better fit their priorities or needs.

By partnering with an issuer, the merchant may link its rewards program to a payment instrument that the customer may use at a variety of merchant locations. The customer benefits from a payment instrument that may be used ubiquitously at different merchant locations in different geographic locations.

The rewards program, may also deepen customer loyalty to the merchant and/or issuer. For example, rewards offered by the merchant may be tied to other products or services offered by the merchant. The rewards may include offering the customer faster service or "bonus" products when making what otherwise would have been a routine purchase. Such rewards offered by the merchant may provide an incentive for customers to shop at a participating merchant location to earn and obtain the rewards. Such rewards offered by the merchant may be leveraged to trigger target customer actions.

The merchant may benefit by having the merchant's brand promoted as a reward option regardless customer's final rewards selection. The merchant may control marketing messages and behavior requirements delivered to customers. Furthermore, the issuer may promote the merchant's reward using one or more of the issuer's platforms for communication with customers. Additionally, the merchant may benefit by converting savings in card (or other payment instrument) acceptance fees to marketing efforts that may increase sales.

From an issuer's perspective, the custom rewards paradigm provides a new and innovative product that enriches the issuer's value proposition associated with its purchasing instrument products. The issuer may also benefit by acquiring new customers as result of the merchants marketing efforts.

System architecture may include mechanisms whereby merchants can submit rewards options and customers can opt-in to be eligible to earn the rewards alternatives. System architecture may also provide one or more sub-systems that enable deployment of varying fee structure for processing such transactions. The sub-systems may utilize unconventional communication protocols and/or hardware to meet or exceed timing requirements and industry standards associated with processing electronic payments. For example, industry standards may demand that not more than 2-3 seconds elapse from a time a customer swipes a payment instrument at a POS terminal until an authorization response is received from the issuer.

Because merchant funded rewards may only be available at merchant locations, it may be desirable to determine customer eligibility for such rewards in real time at a POS. It also may desirable to determine customer eligibility for such rewards before the customer approaches a POS. Unconventional communication protocols and/or hardware may, in real-time, determine custom reward eligibility and merchant cost for a transaction.

In some embodiment, the merchant may be credited for transaction processing fees in a batch settlement at predetermined time intervals.

Notifications of rewards availability may be pushed to customer via mobile device apps. Such apps may be provided by the issuer, merchant or any suitable entity. Rewards availability may be determined based on any suitable factor. Illustrative factors include geolocation, spend analysis, market data and/or social media data.

Embodiments may include a rewards market place. Such a market place may include a real-time market where merchants may submit rewards and allow customers to select rewards that meet their needs. In some embodiment, merchants may be able to view competitor's rewards submissions. Such a market place may provide a platform for real-time competition for customers.

Embodiments may include rewards routing protocols. Such protocols may include mechanisms by which a merchant is notified of a customer's rewards selection. Such a selection may trigger the customer's payment instrument enrollment in an alternative or bypass transaction processing network. The bypass transaction processing network may automatically track custom reward activity and apply appropriate fee schedules. Fee adjustments may include reductions/rebates in one or more fees collected by the acquirer.

Customer may select reward options such as whether to receive rewards in real-time or accrue rewards eligibility over time. Different rewards may be made available depending on whether the customer selects to accrue rewards or receive them in real-time.

Merchant funded rewards and corresponding merchant benefits (e.g., transaction cost adjustments) may be tracked at a merchant POS terminal. For example, when a customer who has opted-in to a merchant funded reward program checks out, fee typically charged to the merchant at the time of the transaction may be reduced or rebated. In some embodiments, the merchant may be responsible for providing systems and architecture for tracking rewards and custom rewards activity. Each POS terminal may log and track such activity.

In some embodiments, the issuer may provide systems and architecture for tracking rewards and custom rewards activity. Furthermore, such issuer systems may also track merchant credits for transactions. Credits may be earned by the merchant when a customer uses a payment instrument associated with a merchant funded reward program. Systems and architecture may include transaction processing network integration to process and track reduced fees.

Embodiments may include integrating merchant credits and/or custom rewards into digital forms of payment other than traditional credit cards. For example, systems and architecture may integrate with a crypto currency marketplace.

Customers may use any preexisting payment instrument deemed eligible by the issuer for a rewards program. The customer may opt-in to a merchant funded rewards program. In some embodiments, the merchant funded reward program may be an exclusive rewards program. For example, an opt-in to the merchant funded reward program may trigger an opt-out of other reward programs. Customers may opt-out of merchant funded rewards programs at any time. Customers may opt back in to traditional rewards at any time.

To access a merchant funded rewards program, a customer may use a payment instrument in possession of the customer before the merchant funded rewards program is rolled out. An issuer may determine eligibility for merchant funded reward program. The issuer may provide notification of customer eligibility to a merchant in an authorization response provided to the merchant.

Apparatus for a real-time, dynamic offer platform is provided. The platform may include a plurality of consumer devices. The platform, may include a plurality of merchant devices. The platform may include a virtual display. The virtual display may be displayable on the plurality of consumer devices and/or on the plurality of merchant devices.

One of the merchant devices may transmit a selectable reward option to the platform. The transmission may be processed in real-time. The transmission may be processed using a batch mode processing. The virtual display may be configured to display the transmitted reward option.

The virtual display, displaying the transmitted reward option, may be displayable on the plurality of consumer devices and/or on the plurality of merchant devices. One of the consumer devices may receive a selection of the transmitted reward option. Upon receiving the selection, the consumer device may store the selected reward option.

At a point-of-sale, when the consumer device is used to finalize a purchase associated with the selected reward option, the consumer device may be configured to communicate with the point-of-sale. The communication may include termination of a custom communication exchange. A custom communication exchange may include communication between a consumer device, a merchant, an acquirer and an issuer. The consumer device communicates with a merchant. The merchant then communicates with an acquirer, which in turn communicates with an issuer. Intermediaries may facilitate communication between the merchant and the issuer. An intermediary may include a bypass, or alternative, transaction processing network.

Upon receipt of approval by the issuer, the issuer communicates the approval to the acquirer, and the acquirer communicates the approval back to the merchant. The communication may include generation of an updated custom communication exchange. The communication may include information about transaction economics as well as rewards information, transaction information, accrued benefits overall (total points displayed on the receipt), etc.

In some embodiments, the updated custom, communication exchange may be transmitted from the point of sale directly to an issuer. It should be appreciated that, in these embodiments, an acquirer and/or network is removed from the communication exchange and/or the acquirer is replaced with a combined acquirer/issuer. In other embodiments, the updated custom communication exchange may be transmitted from the point of sale to an issuer, via an acquirer.

The updated custom communication exchange may include a revised interchange rate passed on to the merchant by the acquirer. The revised interchange rate may be passed on by the acquirer to the merchant associated with the point-of-sale device. The revised interchange rate may be less than an interchange rate included in the initial custom communication exchange.

The updated custom communication exchange may include other updated fees that a merchant may pay such as updated network fees or updated acquirer fees associated with processing of a transaction. The purchase price may be less than a purchase price included in the custom communication exchange. In some embodiments, the selected reward option may be a non-monetary reward. The non-monetary reward may include a free item, a free service and/or a free upgrade. The non-monetary reward may grant the customer access to exclusive products and/or services not available to the general public. The non-monetary reward may include enabling one or more purchases at a preferred shopping time. The non-monetary reward may include any other suitable non-monetary reward. In these embodiments, the purchase price may be equal to a purchase price included in the custom communication exchange. Therefore, in order to communicate the selected reward option to the issuer, a selected reward option complete tag may be associated with the updated custom communication exchange.

The updated custom communication exchange may include a reward tag. The reward tag may be associated with the purchase of the item. The reward tag may be reset to zero from a non-zero value included in the custom communication exchange. The zero value may trigger removal of the purchase from a points eligibility list.

The updated custom communication exchange and/or the custom communication exchange may include interchange information, other transaction economic information, reward information, transaction information, accrued benefits total and any other suitable information. In some embodiments, the accrued benefits total or total points accrued for a specific card product may be displayed on a receipt, on the customer.

The platform may be configured so that each merchant device may update offers, transmit additional offers and/or remove offers in real-time.

In some embodiments, the plurality of consumer devices may be a first plurality of consumer devices. The first plurality of consumer devices may be a second plurality of consumer devices. A consumer device included in the first plurality of consumer devices may be configured to share at least one selectable reward option with a subset of the second plurality of consumer devices. The subset may be a predefined subset. The subset may be distinct for each consumer device. The subset may be defined by the consumer device.

The consumer devices included in the subset may be configured to receive like and/or dislike comments to shared reward offers. Like and/or dislike comments may be displayed on the virtual display of the consumer devices included in the subset. The consumer devices included in the subset may be configured to receive a selection of the shared offers.

A method for rerouting a communication from a first network to a second network is provided. The first network may include a merchant. The merchant may be in communication with an acquirer. The acquirer may be in communication with an issuer. The second network may include at least one merchant. The merchant may be in direct communication with the issuer independent of communication with an acquirer. The second network may include one or more intermediaries (or systems operated by one or more intermediaries) that facilitate communication between the transaction participants. For example, the merchant may submit a transaction to the issuer for authorization using an alternative transaction processing network that provides direct communication between the merchant and issuer.

The method may include receiving a selectable reward option at an offer platform. The reward, option may be received from a merchant device. The merchant device may be included in a plurality of merchant devices. The merchant device may be a POS terminal.

The method may include displaying the reward option on a virtual display. The virtual display may be displayable on the plurality of merchant devices and on the plurality of consumer devices. The method may include receiving a selection of a selectable reward option from a consumer device. The method may include storing the selected reward option on the consumer device. The method may include storing the selected reward option on the offer platform.

The method may include receiving a request for a purchase communication at a point-of-sale associated with the merchant. The purchase communication may be associated with the selected reward option. Upon receipt of the request, a rerouting of the purchase communication via the second network may be triggered. The method may include transmitting the purchase communication directly from the merchant to the issuer via the second network. The second network may be an alternative transaction processing network.

It should be appreciated that fees for use of the second network may be less than fees charged for use of the first network. The second network may be associated with reduced or rebated network fees and/or reduced/rebated acquiring fees. Such fee reductions or rebates may be applied to compensate the merchant for providing customers with custom reward programs. In addition to reductions or rebates of specific transaction fees, other economic incentives may be applied.

In some embodiments, each selectable reward option may include a reward metadata file. The reward metadata file may include information such as geographic location information, market data, target income bracket and/or any other suitable information. In these embodiments, each consumer device may include a dynamic consumer metadata file. The dynamic consumer metadata file may include information such as current geographic location information, spend trends and analysis, income information, social media data and/or any other suitable information. The dynamic consumer metadata file may be updated when a consumer enters a predetermined location. The location may be a shopping center. A consumer associated with the consumer device may enable and/or disable the updating of the dynamic consumer metadata file.

A processor may determine which reward options are relevant for which consumer devices based on a correlation value between the dynamic consumer metadata file and the reward metadata file being greater than a predetermined correlation value. The display of each consumer device may be configured to display the reward options that are determined to be relevant.

A system for offering rewards is provided. A reward may be provided by a merchant. The merchant may offer rewards based on location. A merchant may offer rewards that are specific to customer behavior (or, alternatively "customer action"). Such customer behavior may include geolocation, spend analysis, market data and social media data. Merchant may also create rewards that promote specific customer behavior. Such specific customer behavior may include online pre-ordering of services and/or products. Such specific customer behavior may include purchasing specific items.

Merchants may use the merchant-funded reward to steer or direct a desired customer behavior. For example, a merchant may provide a reward only if a customer uses a self-service check-out kiosk. A merchant may provide a reward only if a customer orders ahead with his/her mobile device. A merchant may provide a reward only if a customer shops within a desired department within a shop. A merchant may provide a reward only if a customer shops at a specific merchant location. A merchant may modify rewards in order to promote specific customer behavior at different locations, different seasons, various times of day or any other reason.

A new card product may offer merchant-funded rewards and reduce costs for the merchant. This may be the exclusive reward associated with this card. This card may be promoted by merchants because the card is associated with a lower-net merchant discount. In some embodiments, custom, rewards can be used to enhance an already existing card product offered by an issuer. For example, card products offered by the merchant, may be eligible for opting into a custom rewards program or retaining an association with other rewards programs.

In such embodiments, the other rewards programs may be the default rewards programs associated with the card product. In other embodiments, custom, rewards may be the default rewards program, and customer may opt-out of custom rewards and opt into another rewards program. In other embodiments, custom rewards may be the exclusive rewards program for a card product.

A custom rewards network may be used to handle custom reward products, such as the new card product. Using the custom rewards network, network and/or acquirer fees may be lowered by avoiding traditional network fees. Customers may opt-in to merchant-funded rewards. Upon customer opt-in, a shift may be triggered to the custom rewards network. Rewards may be offered, at the point-of-sale. If a customer accepts, the transaction may be rerouted, to the custom rewards network. The custom rewards network may be an alternative transaction processing network.

A social media platform may be created around the custom rewards network and/or card product. Cardholders may be able to share offers, receive offers and like and/or dislike offers on the social medial platform. It should, be appreciated that the social media platform may extend to non-cardholders as well. Cardholders may be able to share offers with non-cardholders. This may encourage the non-card holders to apply for the new card.

A real-time market may be instantiated. The real-time market may enable merchants to offer customers a variety of reward choices. Customers may select rewards that meet their respective needs. Merchants may be able to view competitor's reward bids. The marketplace may create real-time competition for cardholder business.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is to be understood that other embodiments may be utilized and that structural, functional and procedural modifications may be made without departing from the scope and spirit of the present disclosure.

The steps of methods may be performed in an order other than the order shown and/or described herein. Method embodiments may omit steps shown and/or described in connection with illustrative methods. Method embodiments may include steps that are neither shown nor described in connection with illustrative methods. Illustrative method steps may be combined. For example, an illustrative method, may include steps shown in connection with another illustrative method.

Apparatus may omit features shown and/or described in connection with illustrative apparatus. Apparatus embodiments may include features that are neither shown, nor described in connection with illustrative apparatus. Features of illustrative apparatus may be combined. For example, an illustrative apparatus may include features shown or described in connection with another illustrative apparatus and/or method.

FIG. 1B shows a device presenting an illustrative offer platform. The offer platform may include one or more than one user interface, such as graphic user interface (GUI) 101 and/or GUI 103.

GUI 101 and/or GUI 103 may be implemented by a mobile app installed and running on a mobile device. The mobile device may be owned by a customer of the merchant/issuer. The customer may own one or more payment instruments. The mobile app may be provided by a merchant, issuer or any suitable transaction participant. An issuer may provide the mobile to customers of a merchant to enable providing customer rewards in response to customer spending. The mobile app may be used to track customer adoption and actions in response to custom reward offerings.

GUI 101 and/or GUI 103 may include one or more platform features. The platform features may include one or more "widgets", windows, virtual tabs, virtual buttons and/or GUI 101 may include a dashboard view. GUI 101 may include a welcome screen. GUI 101 may include features 109, features 111, and/or features 113.

Features 109 may enable a user to log into or out of one or more than one platform account. Features 109 may enable a user to access platform information, such as account alerts and/or notifications. Features 109 may enable a user to access support and/or help information.

Features 111 may include a welcome screen. Features 111 may include one or more indications identifying one or more user accounts. Features 111 may include one or more photos associated with user account(s). Features 111 may include a name(s) and/or username(s) of the user(s).

Features 113 may present general account information associated with the account (s). Features 113 may facilitate accessing the account (s). Features 113 may facilitate transaction(s) with one or more third parties. Features 113 may facilitate accessing of GUI 103.

GUI 103 may include an account screen. GUI 103 may include detailed information associated with one or more of the account(s). GUI 103 may include features 115 and/or features 117. Features 115 may enable logging into or out of user account(s). Features 115 may enable accessing of additional user account information, such as account alerts and/or notifications. Features 115 may enable accessing support, customer service and/or help information.

Features 117 may include detailed account data, such as account history and/or upcoming account events. Features 117 may facilitate making one or more payments to a user account and/or updating account information. Features 117 may facilitate accessing of GUI 101.

Figure 1C:
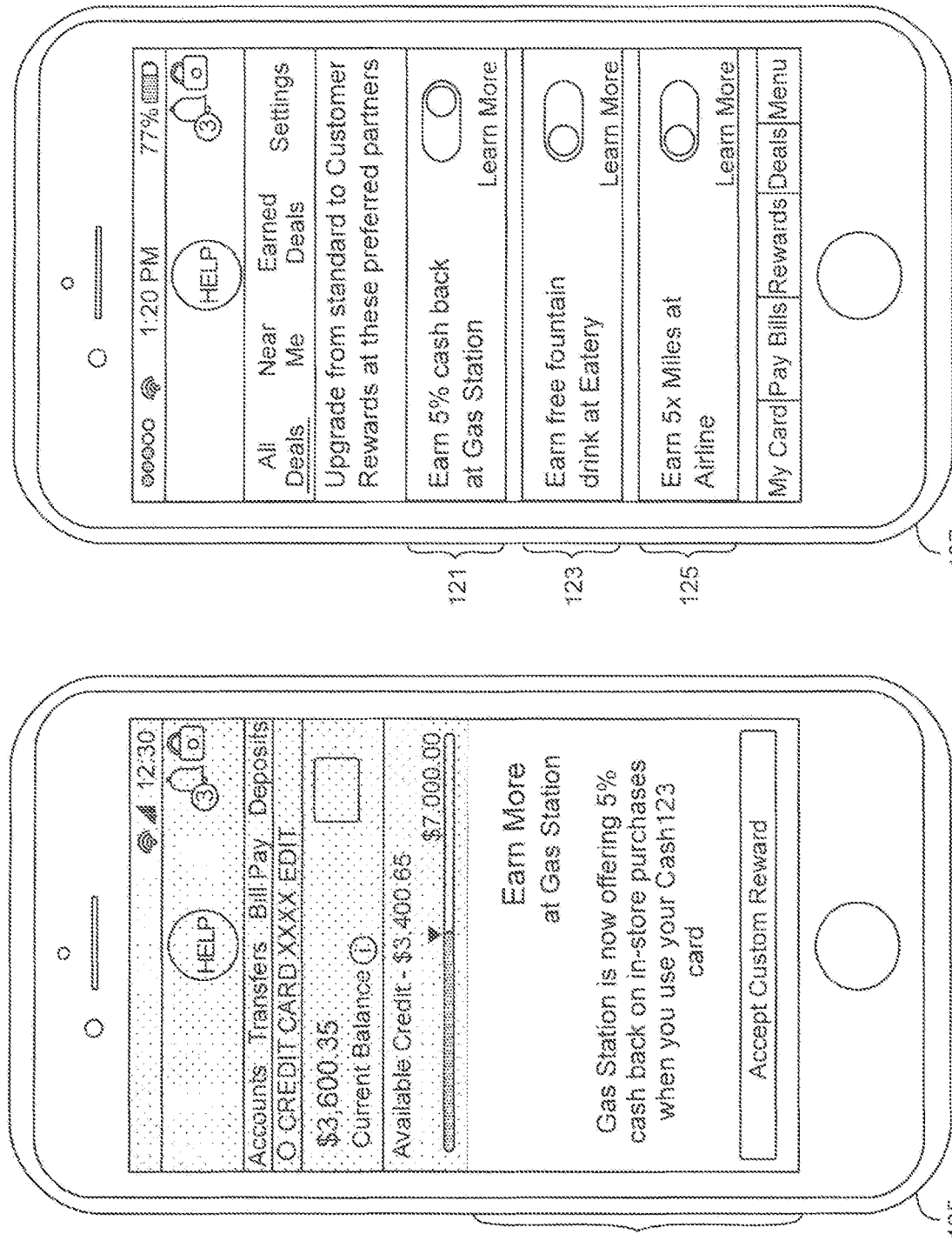
FIG. 1C shows additional illustrative screenshots generated in accordance with principles of the disclosure.

FIG. 1C shows a mobile device presenting an illustrative custom offer platform. The custom offer platform may include one or more than one user interface, such as GUI 105 and/or GUI 107. GUI 105 and/or GUI 107 may include one or more of the platform features described in connection with GUT 101 and/or GUI 103 (shown above in FIG. 1B).

GUI 105 may include one or more than one of the features described in connection with GUIs 101 and 103. GUI 105 may include proactive "shadow box" 119. Shadow box 119 may be configured to display one or more popup windows. Shadow box 119 may present one or more custom merchant reward offers associated with a payment instrument. Shadow box 119 may include general and/or detailed information regarding the offer (s). Shadow box 119 may include one or more features configured to facilitate accepting and/or registering for custom reward offer(s).

Shadow box 119 may be configured to be presented in response to a triggering event. A triggering event may include detected proximity of a customer to a geographic location. The location may be associated with the offer, such as a location of a merchant presenting the offer. The event may include a detected purchase by the user associated with the offer, such as a purchase of a similar or related product and/or service. Presentation of shadow box 119 may be over GUI 103. The event may include activation of one or more of the features of GUI 101, GUI 103 and/or GUI 107.

Upon presentation of GUI 105, shadow box 119 may occlude one or more than one portion of GUI 103. Upon presentation of GUI 105, one or more than one remaining portion of GUI 103 may be shaded and/or inaccessible until removal of shadow box 119.

GUI 107 may include a customer rewards screen. GUI 107 may include some or all of the features described in connection with GUIs 101, 103 and 105, GUI 107 may present general information regarding one or more custom reward offers.

GUI 107 may include one or more features for accepting and/or rejecting the custom reward offers, such as features 121, 123 and 125. In some embodiments, features such as features 121, 123 and 125 may be presented on a merchant POS terminal. Apparatus and methods may adjust the custom rewards presented via features 121, 123 and 125 in response to customer acceptance/rejection of previously presented offers.

Figure 2:
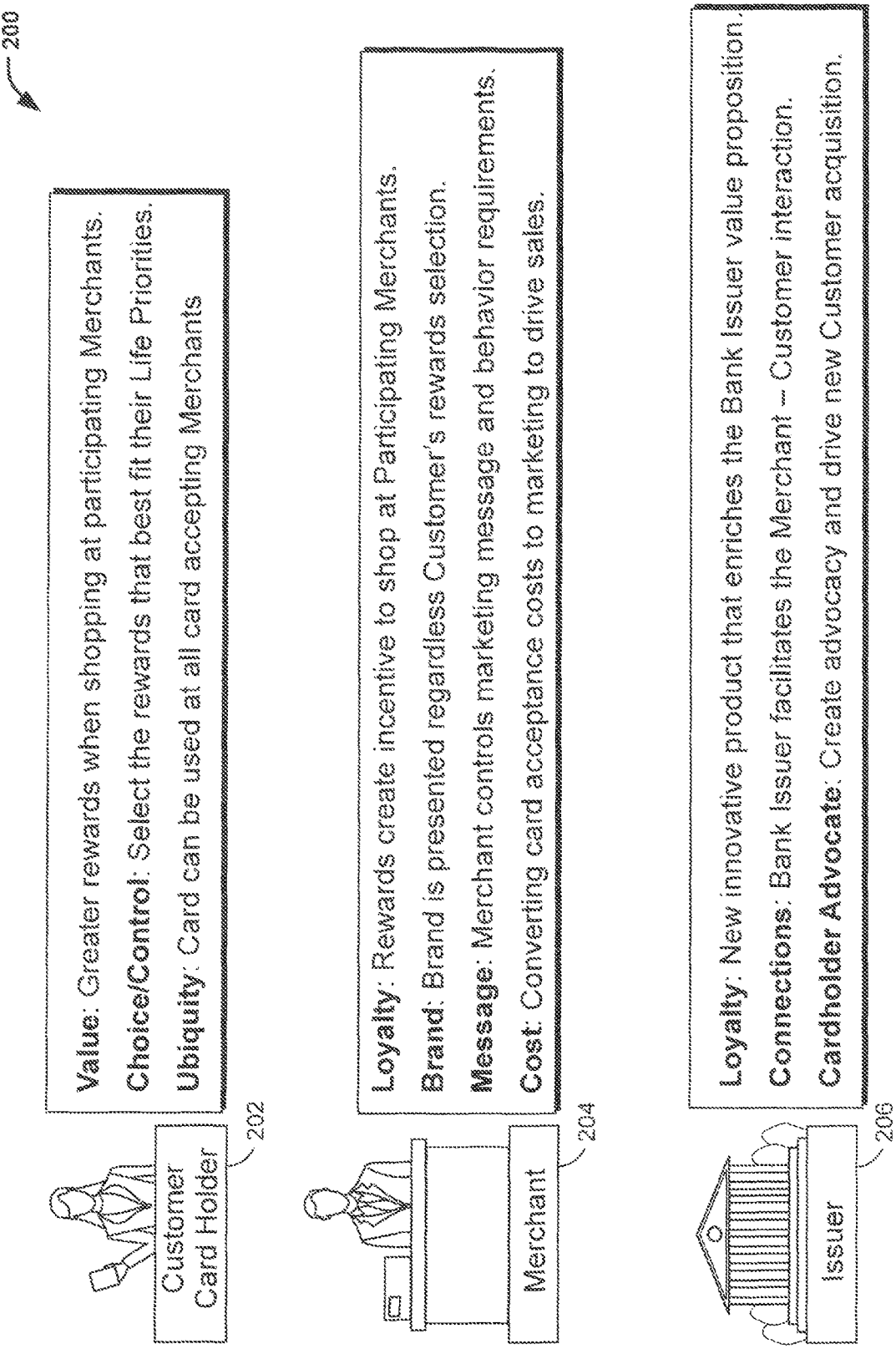
FIG. 2 shows illustrative information in accordance with principles of the disclosure.

Features 121, 123 and 125 show that the customer may toggle a switch to "Learn More," Toggling the switch may link the customer to a merchant website, application or other platform that provides additional information on eligibility criteria for a specific reward. The merchant website, application or other platform may also promote the merchant/s brand, message and value of the custom reward, FIG. 2 shows illustrative information 200. Information 200 includes illustrative advantages to customer 202, merchant 204 and bank issuer 206 when using a merchant funded custom rewards model. Customer 202, merchant 204 and bank issuer 206 may all benefit from having the capability of opting-in to a merchant funded reward program at a point-of-sale.

When using the merchant funded rewards program, customer 202 may receive custom rewards that are greater in value than the standard rewards. Customer 202 may select the custom rewards that best fit their life priorities. Customer 202 may use the payment instrument at all merchants that accept, the payment instrument as payment for goods/services.

Merchant 204 may benefit from, participating in the merchant funded rewards program. Providing merchant-based rewards may incentivize customer 202 to patronize merchants that participate in the merchant funded reward program. Offering custom rewards and displaying the custom rewards in real-time to customer 202 at a POS terminal may promote goods, services or a brand of merchant 204.

Awareness of custom rewards may promote goods, services or a brand of merchant 204 even if a customer does not opt-in to a merchant funded rewards program. In a merchant funded rewards program model, merchant 204 may control its marketing message and customer behavior requirements needed to earn custom rewards. Merchant 204 may leverage adjustments to card acceptance costs provided by bank issuer 206 to market the merchant funded rewards model and increase sales.

Bank issuer 206 may also benefit from participating in the merchant funded rewards program. Innovative credit-product offerings may enhance a value proposition of bank issuer 206. Innovative customer reward offerings of merchant 204 may enhance a value proposition of payment instruments offered by bank issuer 206.

Payment instruments and associated credit provided by bank issuer 206 provide tools for tracking custom reward acceptance by customer 202. Payment instruments and associated credit provided by bank issuer 206 provide tools for customer 202 to conveniently purchase goods/services from, merchant 204.

Bank issuer 206 may derive benefit from, vetting transactions initiated at a POS terminal on behalf of merchant 204. Bank issuer 206 may review a credit-worthiness of customer 202 before authorizing a transaction. Bank issuer 206 may also rebate fees imposed on merchant 204 by a transaction participant. Merchant 204 may promote custom rewards associated with a payment instrument issued by bank issuer 206. Such promotion may drive increased usage of payment instruments provided by bank issuer 206. Bank issuer 206 may gain market exposure and revenue from increased use of its payment instruments.

Payment instrument products offered by bank, issuer 206 may facilitate the merchant-customer interaction (e.g., purchases goods/services offered by merchant 204). Bank issuer 206 may interact directly with customer 202 on features and attributes of a payment instrument. Bank issuer 206 may advocate for customer 202 and drive new customer acquisition.

Figure 3:
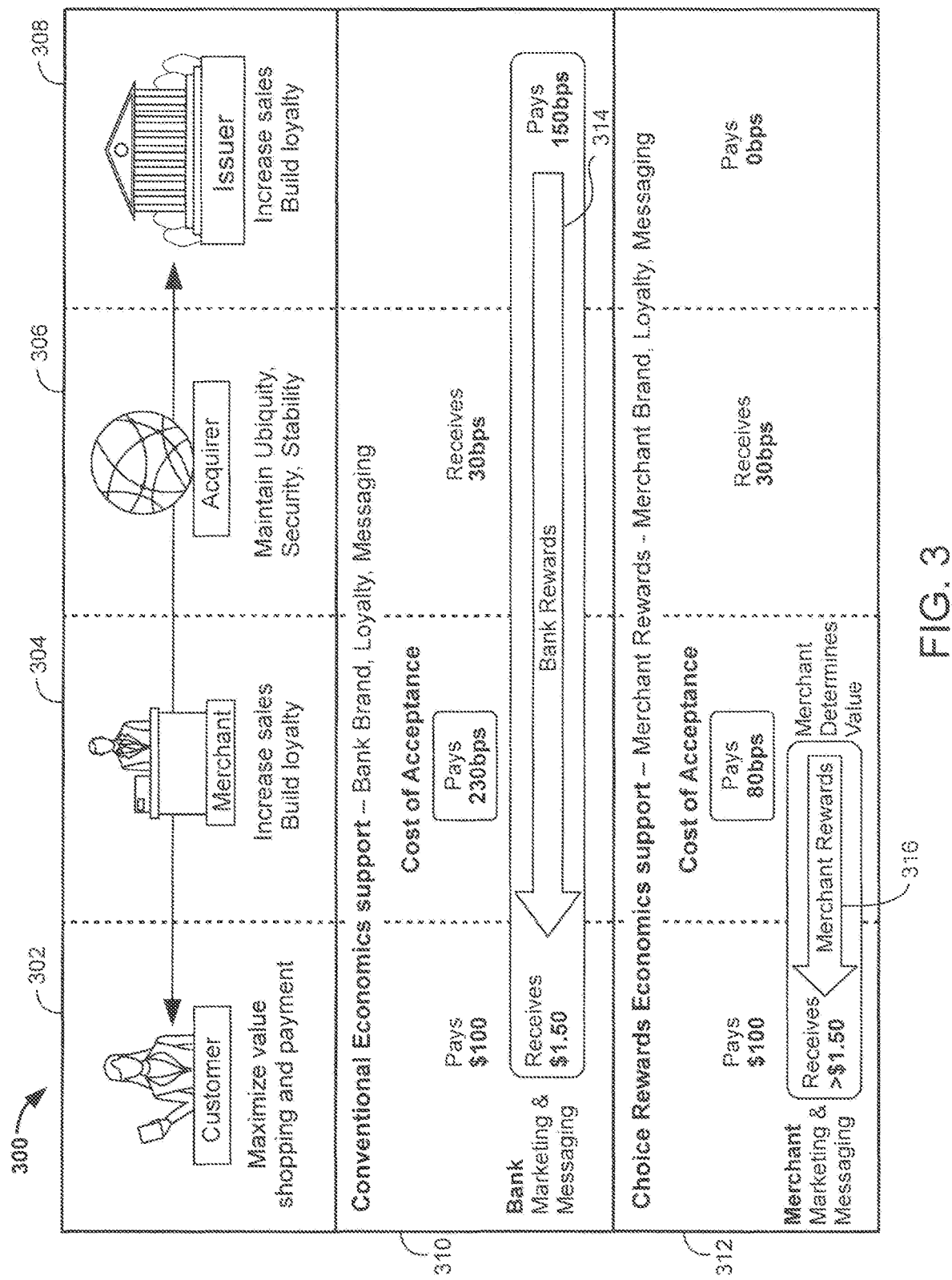
FIG. 3 shows an illustrative process in accordance with principles of the disclosure.

FIG. 3 shows an illustrative process flow 300. Process flow 300 shows values paid and received by transaction participants. An electronic payment processing system may provide hardware and software for transmitting and routing information between each transaction participant.

Column 302 shows illustrative values paid and received by a customer. A customer may seek to maximize a value of goods/services purchased from merchant 204. Column 302 shows that providing custom rewards may increase the value received by a customer.

Column 304 shows illustrative values paid and received by a merchant. A merchant, may wish to increase sales volume and build customer loyalty. Column 304 shows that providing custom rewards may reduce expenses of a merchant.

Column 306 shows illustrative values paid/received by an acquirer/network. An acquirer/network may wish to maintain security, stability, and ubiquity of credit transactions. Column 302 shows that providing custom, rewards may not affect revenue of an acquirer/network.

Column 308 shows illustrative values paid and received by an issuer. An issuer may wish to increase sales and build brand loyalty. Column 308 shows that providing custom rewards may increase the value received, by an issuer.

In process flow 300, row 310 represents a distribution of value among transaction participants using a conventional rewards model. A conventional rewards model may be funded solely by an issuer. The economics of the conventional rewards model may reinforce the issuer bank brand, issuer customer loyalty, and marketing to an issuer bank, customer base.

Row 312 represents a distribution of value among transaction participants associated with a credit transaction using a merchant funded rewards model. Economics of a merchant funded rewards model may also reinforce a merchant brand, merchant customer loyalty, and messaging to a merchant customer base.

Row 310 shows that a customer (column 302) may present a payment instrument at a POS terminal to initiate a purchase. The purchase price may be $100. The cost of acceptance, (or transaction cost or merchant discount), for the purchase may be imposed on the merchant. Column 304 shows an exemplary cost of acceptance imposed on a merchant.

Row 310 shows that in a conventional rewards model the merchant may pay value corresponding to 230 basis points ("bps"). Each bps may correspond to 0.01% of a purchase price. In row 310, the merchant may pay $2.30 as a transaction cost.

Column 306 shows that acquirer/network receives 30 bps of the transaction cost shown in row 310 (or $0.30). 30 bps may be the amount received by the acquirer/network net expenses. Column 308 shows that 150 bps (or $1.50) is paid by the issuer as a bank reward 314. Reward 314 is ultimately received by the customer, as shown in column 302.

Row 312 shows an illustrative distribution of value among transaction participant using a merchant funded reward model. Row 312 shows a customer (column 302) may present a payment instrument at a POS terminal to initiate a purchase. The purchase price may be $100. The cost of acceptance of the credit transaction may be imposed on the merchant. The cost of acceptance is shown in column 304. Column 304 shows that merchant may pay 80 bps ($0.80) as a total transaction cost using the merchant funded reward model. This merchant transaction cost is 150 bps less than the merchant transaction cost imposed in row 310 using the conventional rewards model.

In row 312, the acquirer/network receives 30 bps of the transaction cost ($0.30). 30 bps may be the amount received by the acquirer/network net expenses. Process flow 300 shows that value received by the acquirer/network may remain the same under both rewards models. In some embodiments, under a merchant funded reward model, the value netted by the acquirer/network may change. For example, the 30 bps amount may be lowered as a result of participating in a custom reward program.

Column 304 shows that in row 310, a 150 bps transaction cost is paid by the issuer. Under the merchant funded rewards model, an issuer may not pay any value in rewards. Column 308 shows that a net value paid by the issuer in row 312 is 0 bps.

Column 304 shows that in row 312, the merchant transfers reward 316 directly to the customer (column 302). Reward 316 may be structured so that a cost to the merchant is less than a value of the reward received to the customer. In the exemplary transaction of row 312, the merchant may offer a reward that costs the merchant less than $1.50, yet the reward may have a value greater than $1.50 to the customer. A total transaction cost to the merchant may be less than the $2.30 transaction cost shown in row 310 under the conventional rewards model. Furthermore, reward 316 received by the customer (column 302) in row 312 may have a value greater than the $1.50 (item 314) in value received by the customer in row 310.

Figure 4:
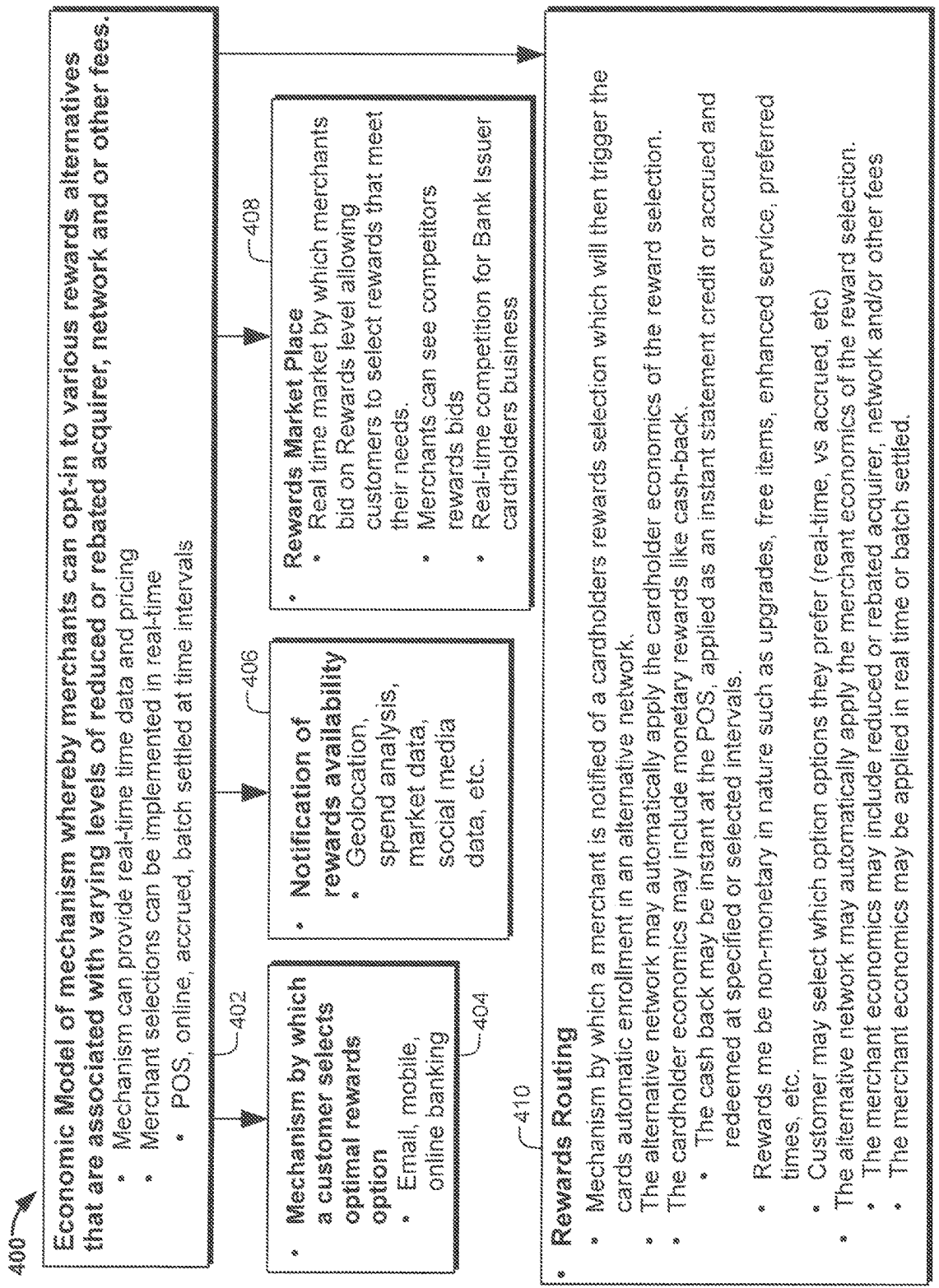
FIG. 4 shows illustrative information in accordance with principles of the disclosure.

FIG. 4 shows an illustrative outline 400. Outline 400 shows mechanisms (e.g., software and hardware) that may be used to implement a merchant funded rewards offer platform. 402 provides a high-level statement of functionality of a merchant funded rewards offer platform. A merchant funded rewards platform may include mechanisms for merchants to opt-in to various rewards alternatives that are associated with varying levels of reduced/rebated acquirer and/or network fees. A merchant funded rewards platform may include mechanisms that provide real-time data and pricing. Merchants may opt-in (or out) to a merchant funded reward program, based on real-time data and pricing associated with a particular program. Merchant selections may be implemented in real-time. They may be implemented at a POS terminal. They may be implemented online. They may be accrued and/or batch settled at time intervals.

404 represents mechanisms for a customer to select optimal rewards options are described. A customer may select reward options via email, mobile and/or online banking.

406 represents mechanisms that provide notifications of custom reward availability. The notification may be triggered by geolocation, spend analysis, market data and or social media data.

408 represents mechanisms for implementing a rewards marketplace. The rewards marketplace may be a real-time market by which merchants may bid on a rewards level. The rewards level may enable customers to select rewards that meet their needs and/or standards. A rewards marketplace may enable merchants to view competitor's rewards bids. A rewards marketplace may enable real-time competition for bank issuer cardholder (or owner of any other payment instrument) business by offering various custom rewards for payment instrument.

410 represents mechanisms for routing rewards. When a merchant is notified of a cardholder's (or owner of any other payment instrument) rewards selection, the payment instrument may be enrolled in an alternative network. The alternative network may be configured to apply an economic model associated with the reward selection. The economic model may include monetary rewards. Illustrative monetary rewards may include cash-back rewards. The cash-back may be provided instantly at a POS. Cash-back may be applied as an instant statement credit or accrued and redeemed at specified and/or selected intervals.

Rewards may be non-monetary in nature. For example, rewards may be upgrades, free items, enhanced service and/or preferred service times. Mechanisms may allow customers to select which options they prefer. Options may include real-time or accrued rewards. The alternative network may apply a merchant's economic model to the reward selection. The economic model may include reduced (or rebated) acquirer and/or network fees. The reduction or rebate may be based on the reward offered by the merchant to a customer. The merchant selection of a reward to offer the customer may be based on the magnitude of the reduction. An economic model may be applied in real-time or may be batch settled.

Figure 5:
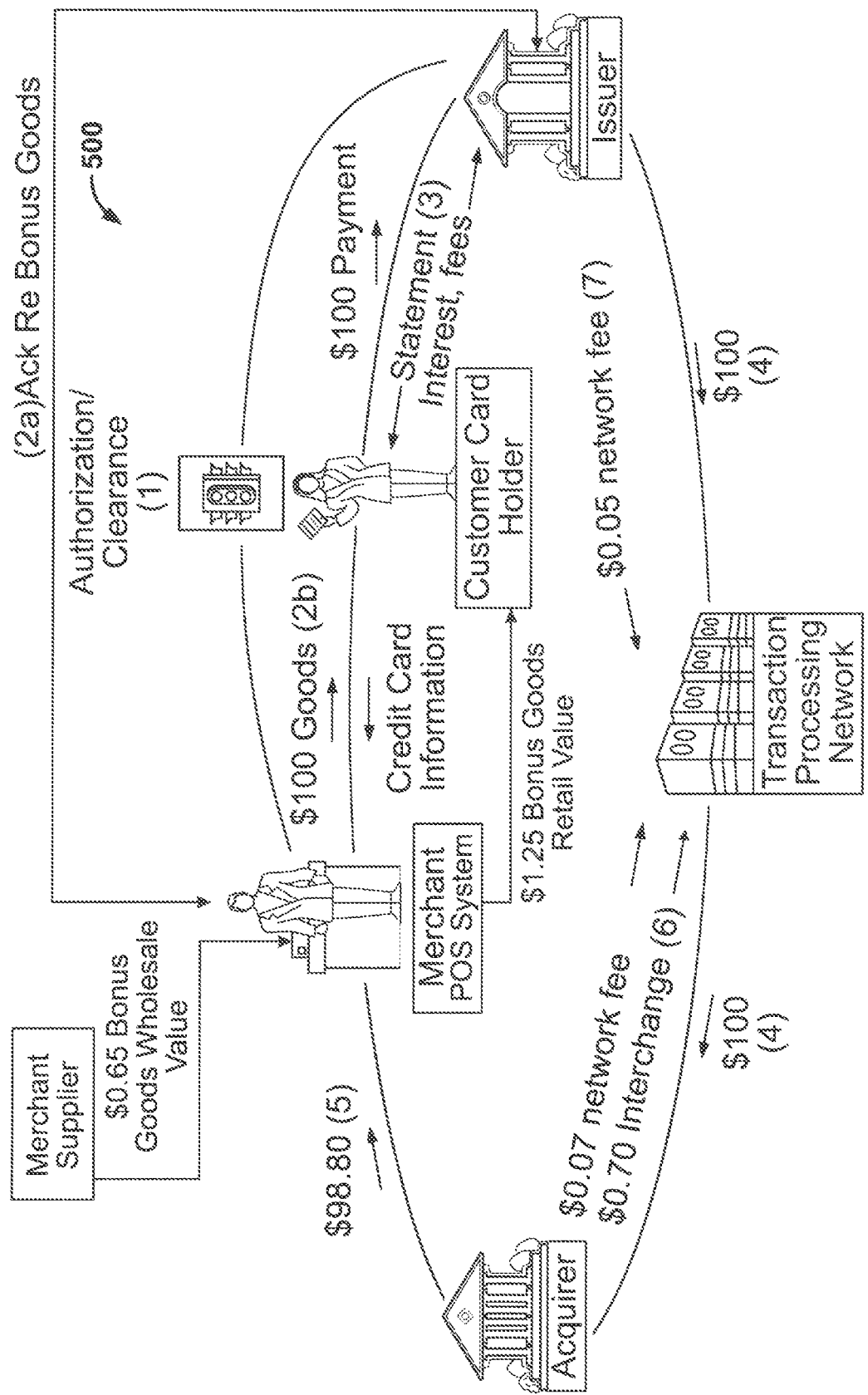
FIG. 5 shows an illustrative system architecture in accordance with principles of the disclosure.

FIG. 5 shows illustrative transaction flow 500. Transaction flow 500 may be an illustrative transaction flow in accordance with a merchant funded rewards model. Transaction flow 500 includes unconventional communication paths and unconventional interactions between system components. The unconventional process may allow a merchant funded rewards model to be implemented within strict time requirements imposed on conventional transactions.

FIG. 5 shows that a merchant POS system may determine that customer is eligible for a custom reward. FIG. 5 shows that the reward may have a $1.25 value to the customer. The merchant POS system may determine an appropriate reward based on tracking purchases captured by the POS system. The POS system, may identify a reward that costs less than $1.25 to the merchant. FIG. 5 shows that the reward provided by the merchant to the customer may cost the merchant $0.65. The POS system may identify a reward that has at least a $1.25 in perceived value to the customer.

The perceived value may accrue due to timing of when the custom reward, is provided to the customer. The perceived value may accrue due to timing of where the custom, reward is provided to the customer. The perceived value may accrue due to identity of the custom reward provided to the customer. The timing, location and identify of the custom, reward may be determined by a POS system, that tracks and monitors customer activity at the merchant.

FIG. 5 shows that at step (1), the merchant provides information, relating to a proposed transaction between the merchant and a customer, to a transaction authorization and clearance provider. The transaction authorization and clearance provider may be a transaction processing network. The transaction authorization and clearance provider may be an issuer. The transaction authorization and clearance provider may be an alternative transaction processing network.

The transaction authorization and clearance provider may provide transaction authorization and clearance information to the merchant. The transaction authorization and clearance information may include authorization (or denial) for the transaction to proceed.

At step (2a), the merchant provides an acknowledgment to the issuer that a custom reward (e.g., "bonus" goods) has been provided to the customer. The acknowledgement may be provided to the issuer in parallel with authorization/clearance process (1). Authorization/clearance process (1) may be performed independently of step (2a).

At step (2b), the merchant provides $100 in product to the customer. The customer pays with a credit card (or any other suitable payment instrument). At step (3), the issuer transmits to the customer a statement showing the $100.00 purchase price due. The issuer collects the purchase price amount, along with interest and fees if appropriate, from the customer. At step (4), the issuer routes the $100.00 purchase price amount through the transaction processing network to the acquirer. At step (5), the acquirer partially reimburses the merchant for the purchase price amount.

In transaction flow 500, the partial reimbursement is $98.80. The difference between the $98.80 reimbursement amount and the $100.00 purchase price amount is a $1.20 transaction cost. Even considering the merchant's $0.65 cost of bonus goods provided to the customer, the merchant's total transaction cost (including the $0.65 cost of the bonus goods) is $1.85, which is less than the $2.00 merchant transaction cost shown above in FIG. 1A (which was determined based on a conventional rewards model). Additionally, in FIG. 5 the customer is provided with a net gain of $1.25, which was not the case in FIG. 1A.

Step 6 shows that the interchange fee is $0.70. This interchange fee is approximately 53% less than the $1.50 interchange fee shown in FIG. 1A. The transaction processing network may set lower interchange fees for merchants that participate in a customer rewards program. Step 6 shows that the acquirer collects the $0.70 interchange amount and $0.07 network fee and transfers the amounts to the transaction processing network. At step 7, the issuer pays a $0.05 network fee to the transaction processing network.

TABLE 3

Net positions, by participant, based on transaction flow 500 (shown in FIG. 5).

| participant | Net ($) |
| --- | --- |
| Acquirer | 0.43 |
| Issuer | −0.05 |
| Transaction processing network | 0.82 |
| Merchant | −1.85 |
| Customer | 1.25 |

Figure 6:
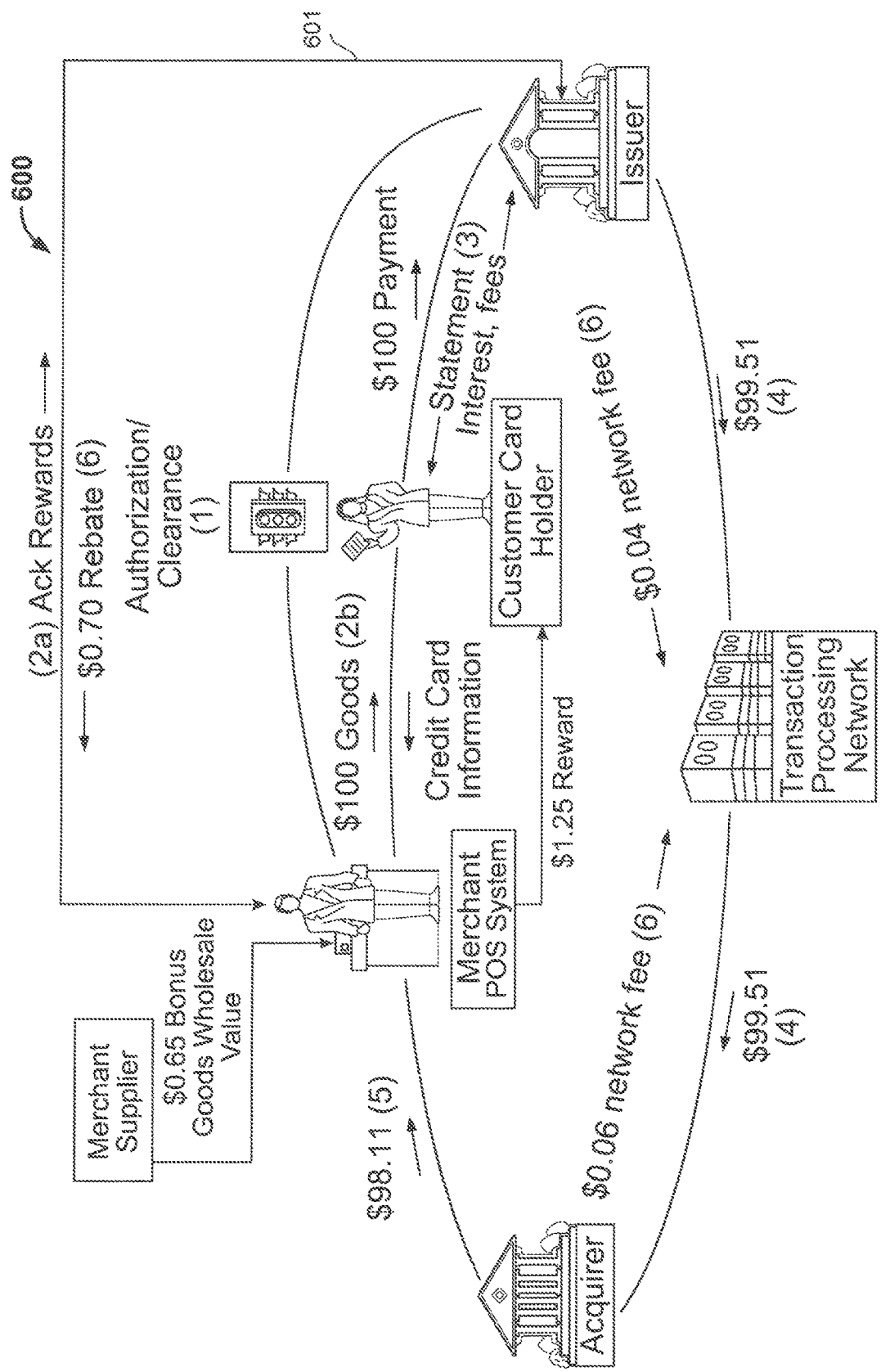
FIG. 6 shows an illustrative system architecture in accordance with principles of the disclosure.

FIG. 6 shows illustrative transaction flow 600. Transaction flow 600 may be an illustrative transaction flow in accordance with a merchant funded rewards model. Transaction flow 600 includes unconventional communication paths and unconventional interactions between system components of transaction participants. The unconventional process may allow a merchant funded rewards model to be implemented within strict time requirements imposed on conventional transactions.

FIG. 6 shows that a merchant POS system may determine that a customer is eligible for a custom reward. FIG. 6 shows that the reward may have a $1.25 value to the customer. The merchant POS system may determine an appropriate reward based on tracking transaction data captured by the POS system. The POS system may identify a reward that costs less than $1.25 to the merchant. FIG. 6 shows that the reward provided by the merchant to the customer may cost the merchant $0.65. The POS system may identify a reward that has at least a $1.25 in value to the customer. The reward may be identified based on inventory at the merchant location visited by the customer.

The value to the customer may accrue due to timing of when the custom reward is provided to the customer. The value to the customer may accrue due to timing of where the custom reward is provided to the customer. The value to the customer may accrue due to identity of the custom reward provided to the customer. The timing, location and identity of the custom reward may be determined by a POS system that tracks and monitors customer activity at the merchant.

FIG. 6 shows that at step (1), the merchant provides information to a transaction authorization and clearance provider. The provided information relates to a proposed transaction between the merchant and a customer. The transaction authorization and clearance provider may be an issuer. The transaction authorization and clearance provider may provide transaction authorization and clearance information to the merchant. The transaction authorization and clearance information may include authorization (or denial) for the transaction to proceed.

At step (2a), the merchant provides an acknowledgment to the issuer that a custom reward ("bonus" goods) has been provided to the customer. The acknowledgement may be provided to the issuer in parallel with authorization/clearance process (1). Authorization/clearance process (1) may be performed independently of acknowledgement step (2a). Steps (1) and (2a) may be performed using resources of alternative communication path 601.

Transaction flow 600 also shows that step (2a) may include the issuer providing a $0.70 rebate to the merchant. Step (2a) shows that the rebate is transferred to the merchant using alternative communication path 601. A merchant may receive a rebate from the issuer before incurring a merchant discount paid to the acquirer. As a result of alternative communication path 601, the merchant and issuer may communicate in parallel with a routing of transaction data to transaction processing network and acquirer.

The parallel processing may allow a transaction associated with a custom reward to be completed within strict timing requirements associated with electronic payment processing. The parallel processing using alternative communication path 601 may also reduce transaction costs. The acquirer and/or transaction processing network may not process the acknowledgement and/or authorization/clearance request, reducing the amount of data processed by the transaction processing network. Furthermore, because the merchant has already received $0.70 from the issuer, a smaller amount of funds (e.g., $99.51 instead of $100) is routed through the transaction processing network.

Reducing the amount of data and funds processed by the acquirer and/or transaction processing network may reduce fees set by the transaction processing network and/or acquirer. Anticipated savings may be passed on to the merchant.

At step (2b), the merchant provides $100 in product to the customer. The customer pays with a credit, card (or other payment instrument). At step (3), the issuer transmits to the customer a statement showing the $100.00 purchase price due. The issuer collects the purchase price amount, along with interest and fees if appropriate, from the customer.

At step (4), the issuer routes $99.51 through the transaction processing network to the acquirer. The amount, routed by the issuer through the transaction processing network may depend on a size of the rebate provided to the merchant and costs incurred by the transaction processing network and acquirer. In some embodiments, the issuer may transfer additional funds directly to the merchant using alternative communication path 601. At step (5), the acquirer reimburses the merchant $98.11.

In transaction flow 600, the merchant is reimbursed $98,11 by the acquirer. The difference between the $98.11 reimbursement amount and the $100 amount of goods provided to the customer is a $1.89 merchant discount amount. This merchant discount is further reduced by the $0.70 rebate provided to the merchant directly by the issuer and increased by the $0.65 cost of the bonus goods provided to the customer. Thus, in transaction flow 600, the total merchant discount is $1.84.

In transaction flow 600, fees charged by the acquirer and the transaction network are less than the fees shown above in FIGS. 1A and 5. The fees charged by the acquirer and the transaction network may be less than the fees shown above in FIGS. 1A and 5 as a result of levering the alternative communication path. In transaction flow 600, savings from a reduction in fees charged by the acquirer and the transaction network have been passed on the merchant.

In FIG. 6, in response to providing acknowledgement to the issuer that a custom reward has been provided to the customer, the merchant receives a rebate of $0.70 from the issuer in step (2a) via alternative communication path 601. As a result of the exchange of data and funds between the merchant and issuer at step (2a), the quantity of data and amount of funds routed through the transaction processing network and acquirer at steps (4), (5) and (6) is less than the amount of data/funds routed in FIGS. 1A and 5.

Fees collected by transaction processing networks and acquirer may be computed based on the amount of funds and/or data/bandwidth usage of network pathways provided by the acquirer and/or transaction processing network. Fees assessed by transaction processing networks and acquirer may be further reduced or rebated by the issuer based on a merchant's participation in a merchant funded rewards program.

Even considering the merchant's cost of bonus goods provided to the customer, the $1.84 merchant transaction cost in transaction flow 600 is less than the $2.00 merchant transaction cost shown above in FIG. 1A (which was determined based on a conventional rewards model). Furthermore, the merchant transaction cost of $1.84 is one cent less than the transaction cost of $1.85 shown in FIG. 5. Additionally, in transaction flow 600 the customer is provided with a net gain of $1.25, which was not the case in FIG. 1A.

At step 6, both the acquirer and the issuer pay a transaction processing network fee ($0.06 for acquirer and $0.04 for the issuer) to the transaction processing network.

TABLE 4

Net positions, by participant, based on transaction flow 600 (shown in FIG. 6).

| Participant | Net ($) |
| --- | --- |
| Issuer | −0.25 |
| Acquirer | 1.34 |
| Transaction processing network | 0.10 |
| Merchant | −1.84 |
| Customer | 1.25 |

Figure 7:
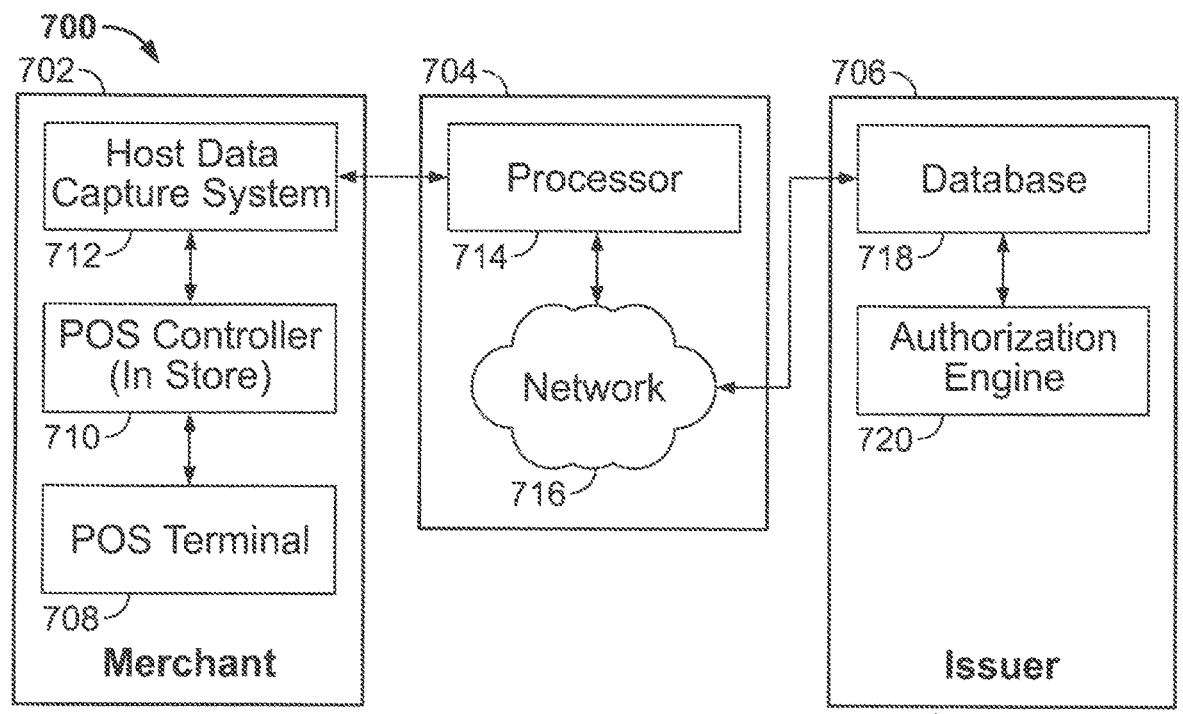
FIG. 7 shows illustrative system components in accordance with principles of the disclosure.

FIG. 7 shows illustrative system 700 for processing and communicating transaction information. System 700 may be used to track merchant funded rewards and corresponding merchant benefits. System 700 may be used to identify customers that are eligible for a custom reward. System 700 may be used to determine an appropriate custom reward to offer a customer at a POS terminal.

System 700 may include merchant component 702, network component 704 and issuer component 706. In general, a system such as 700 may include many merchant components such as 702, many issuer components such as 706 and many network components such as 704.

A customer may purchase goods by transferring customer information from a payment instrument, such as a credit card, to point-of-sale ("POS") terminal 708. POS terminal 708 may read or otherwise capture customer information from the card. The payment, instrument may store data in a magnetic strip, a bar code, a silicon chip or any other suitable data storage device or format. The customer information may include issuer information, account information and any other suitable information.

POS terminal 708 may transmit transaction data to POS controller 710. POS controller 710 may ingest the transaction data. The transaction data may include some or all of the customer information and any other suitable information, such as the transaction amount, information regarding the purchased goods and one or more values associated with the transaction.

POS controller 710 may act as a server for providing user prompts and display layout information to one or more POS terminals such as POS terminal 708. POS controller 710 may receive and ingest transaction data from one or more of the POS terminals.

POS controller 710 may transmit, transaction data to host data capture system 712. Host data capture system 712 may store transaction data received, from POS controller 710. Host data capture system 712 may store accounting data, inventory data and other suitable data that may be included in the transaction information. A custom rewards offered at POS terminal 708 may be determined based on transaction data stored in host data capture system 712. "Ingesting" transaction data may include determining a custom reward for the ingested transaction data.

The transaction data may include information about the merchant, the merchant's business, the merchant's network membership, the merchant's business behavior and any other suitable information. Transaction information may include some or all of the information that is necessary to identify custom reward eligibility. Custom rewards eligibility, or determination of a specific custom reward to offer a customer, may depend on factors, such as customer spend rate, purchasing behavior, time/date, geolocation, interchange rate, network rates, merchant type, merchant size, transaction processing method, and any other suitable factors. Transaction data may include one or more of the foregoing factors and any other suitable factors.

The transaction information may be stored in any suitable element of merchant component 702, network component 704 and issuer component 706. For example, transaction cost information may be stored in processor 714. Processor 714 may include algorithms, including machine learning algorithms, that may be used to identify a custom reward for a customer transaction taking place at POS terminal 708.

For example, the merchant may offer different rewards to different customers. Offered rewards may depend of what the customer typically purchases (at the merchant or other merchants). Rewards may depend of a payment instrument used by the customer to complete a purchase. After a custom reward is identified, processor 714 may transmit the reward, via merchant components 702, to POS controller 710.

Host data capture system 712 may be configured to determine eligibility for a custom reward or merchant funded rewards program. Host data capture system 712 may track earning and spending of rewards associated with a payment instrument. POS controller 710 may be configured to determine eligibility for a rewards program and/or the earning or spending of custom rewards.

POS terminal 708 may have one or more interactive features that a customer may use. The features may provide the customer with information that may help the customer decide whether to execute a transaction. The customer may use the features to obtain more information about the merchant, the transaction, a custom reward, a custom rewards program, costs associated with different payment instruments, or any other suitable information.

Host data capture system 712 may route the transaction record to processor 714. The illustrative systems shown in FIGS. 7 and 8 may include one or more other processors that perform tasks that are appropriate for the components thereof.

Processor 714 may route the transaction record, via network 716, to database 718. Network 716 may be a default transaction processing network. Network 716 may be a bypass, or alternative, transaction processing network. The routing of a transaction record may be governed by the transaction data or rewards eligibility. For example, eligibility for a merchant funded rewards program may be associated with a bank issuer number ("BIN") that is encoded in the customer's payment instrument. Authorization engine 720 may render a transaction authorization decision based on the transaction data and/or transaction record.

Authorization engine 720 may transmit an authorization response back to POS terminal 708 through network 716, processor 714, host data capture system 712 and POS controller 710. The authorization response may include the authorization decision (e.g., "GRANTED" or "DENIED"). The authorization decision may include some or all of the transaction data or custom rewards information (e.g., specific rewards, eligibility or rewards accrued). The transaction data may be used by processor 714 to route the authorization decision back to the merchant and the POS terminal where the customer is present.

Figure 8:
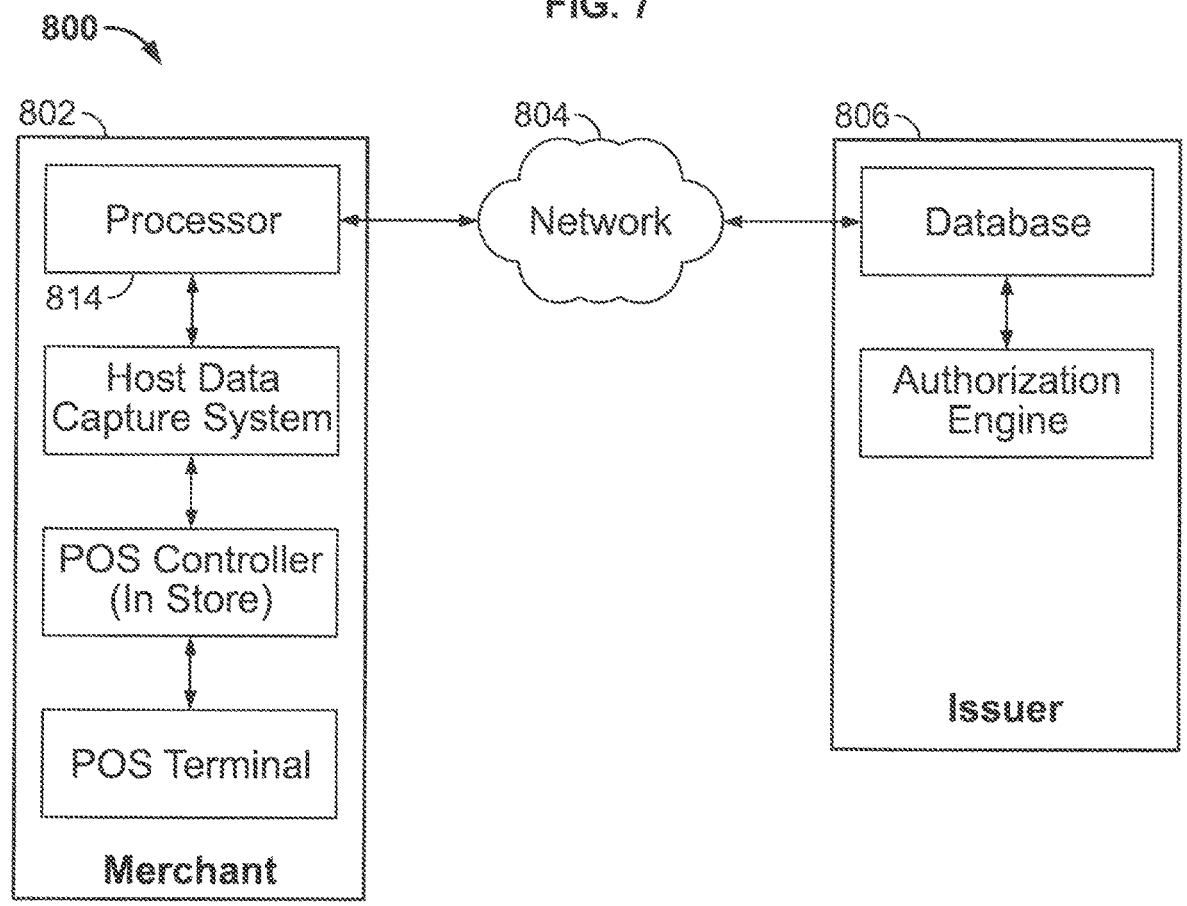
FIG. 8 shows illustrative system components in accordance with principles of the disclosure.

FIG. 8 shows illustrative system 800 for processing and communicating payment instrument and transaction data. System 800 may include merchant component 802, network component 804 and issuer component 806. In general, a system such as 800 may include many merchant components such as 802 and many issuer components such as 806. System 800 may have one or more of the features that are described herein in connection with system 700.

In system 800, processor 814 may be present in merchant component 802. Corresponding processor 814 is present in network component 704 (shown in FIG. 7). In some embodiments, processor 814 may be present in issuer component 806. For example, for embodiments that utilize the process shown in FIG. 6, processor 814 may be present in merchant component 802 or issuer component 806. Removing processor 814 from network component 804 may provide an unconventional communication pathway for implementing a bypass, or alternative, transaction processing network. Processes in accordance with the principles of the invention may include one or more features of the processes shown in FIGS. 1B-6.

Figure 9:
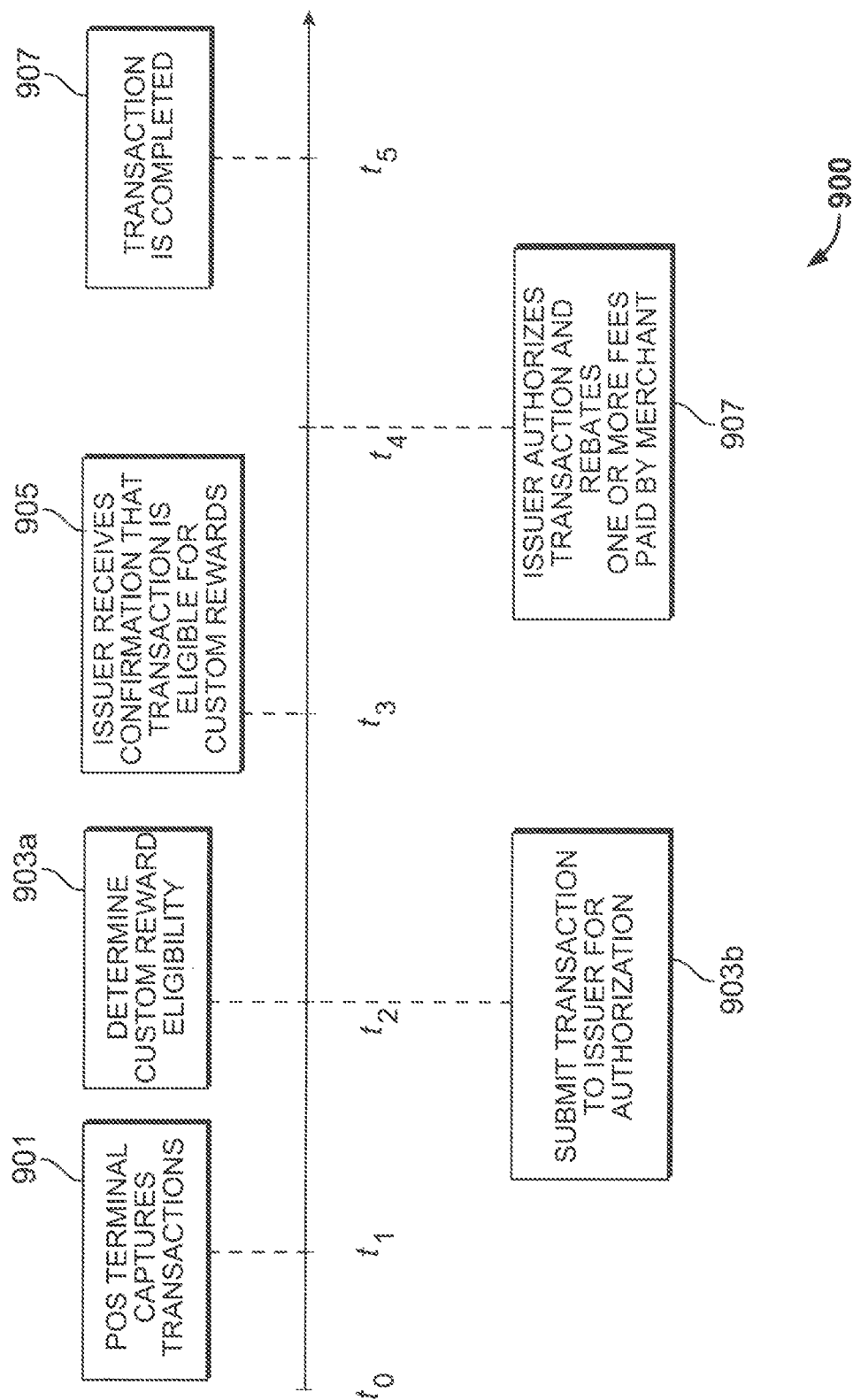
FIG. 9 shows an illustrative process in accordance with principles of the disclosure.

FIG. 9 shows illustrative process 900. For the sake of illustration, the steps of process 900 may be described as being performed by a "system." The "system" may include one or more of the features of the apparatus that are shown in FIGS. 5-8 and/or of any other suitable device or approach.

Process 900 begins at $t_1$ when a POS terminal captures one or more transactions and associated transaction data. At $t_2$, the POS terminal may, unconventionally, perform two tasks in parallel. 903a shows that at $t_2$ the POS terminal determines custom reward eligibility for the captured transaction data. In parallel with determining custom reward eligibility, 903b shows that at $t_2$ the POS terminal also submits the transaction data to an issuer for authorization.

At $t_3$, an issuer system, receives confirmation that, the transaction data captured, by the POS terminal is eligible for a custom rewards program. At $t_4$, the issuer system authorizes the transaction data captured at $t_1$, and rebates one or more fees collected from the merchant that, operates the POS terminal. At $t_5$, the transaction initiated at the POS terminal is completed within a strict time limit associated with conventional electronic payment processing.

Figure 10:
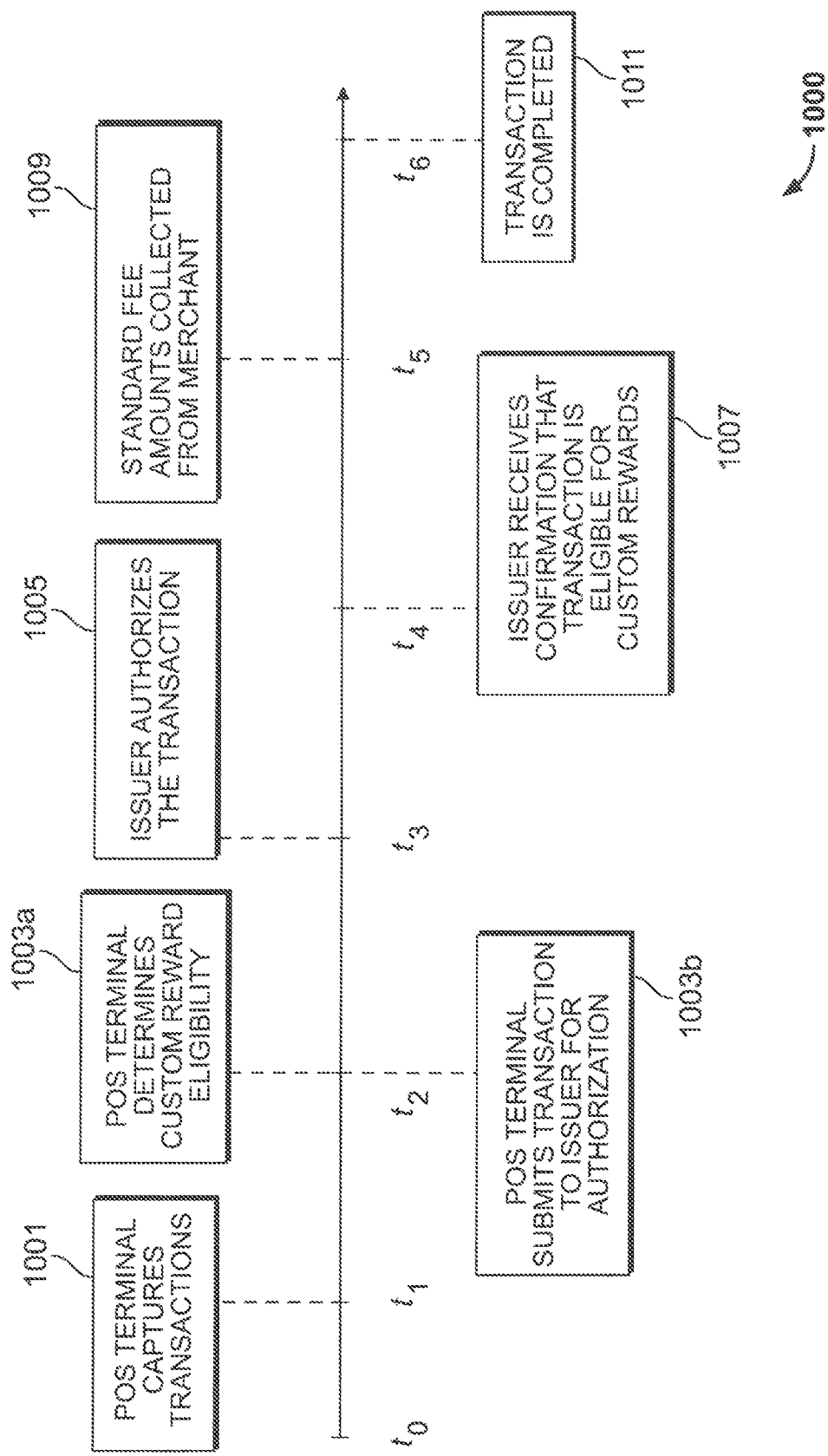
FIG. 10 shows an illustrative process in accordance with principles of the disclosure.

FIG. 10 shows illustrative process 1000. For the sake of illustration, the steps of process 1000 may be described as being performed by a "system," The "system," may include one or more of the features of the apparatus that are shown in FIGS. 5-8 and/or of any other suitable device or approach.

Process 1000 begins at $t_1$ when a POS terminal captures one or more transactions and associated transaction data. At $t_2$, the POS terminal may, unconventionally, perform, two tasks in parallel. 1003a shows that at $t_2$ the POS terminal determines custom reward eligibility for the transaction data. In parallel with determining the custom reward eligibility, 1003b shows that at $t_2$ the POS terminal also submits the transaction data to an issuer for authorization.

At $t_3$, an issuer system authorizes the transaction captured by the POS terminal. In some embodiments, the issuer system may authorize the transaction without finalizing an economic incentive provided to the merchant.

At $t_4$, the issuer system receives confirmation that the transaction data captured by the POS terminal is eligible for a custom rewards program. At $t_5$, a standard (e.g., non-adjusted) merchant discount is collected from the merchant. In some embodiments, if the merchant had submitted confirmation 1007 to the issuer before the issuer authorized the transaction at $t_5$, the merchant may have received a reduction/rebate on one or more fees associated with the standard merchant discount.

A merchant may not receive any reduction/rebate of fees if the merchant delays submitting confirmation 1007. In some embodiments, the issuer system may reduce/rebate one or more fees paid by the merchant even if confirmation 1007 is received after the issuer system authorizes the transaction initiated at the POS terminal.

At $t_6$, the transaction initiated at the POS terminal is completed within a strict time limit associated with conventional electronic payment processing.

Figure 11:
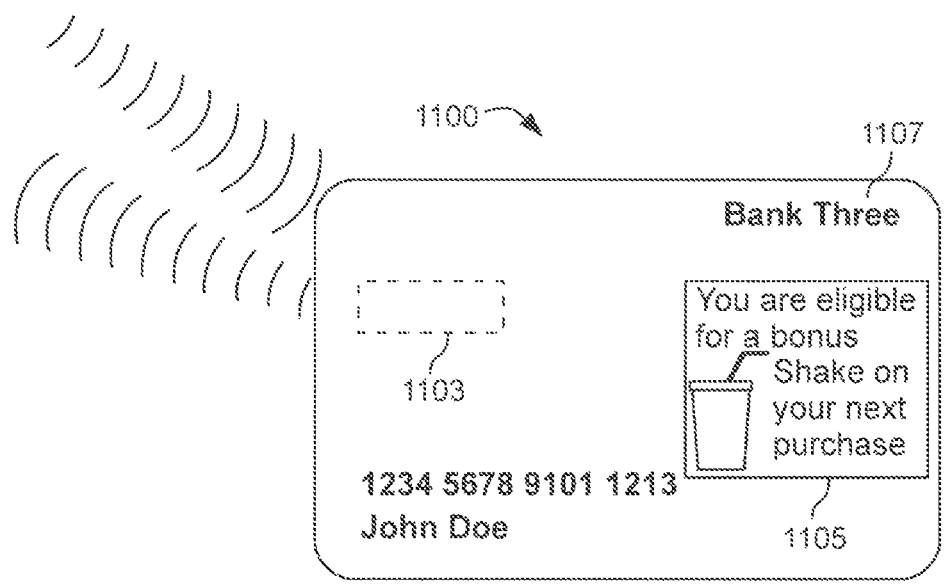
FIG. 11 shows illustrative apparatus in accordance with principles of the disclosure.

FIG. 11 show's illustrative payment instrument 1100. 1107 shows that payment instrument 1100 is issued by "Bank Three." Payment instrument 1100 includes transceiver 1103. Transceiver 1103 is shown in broken line because it may be embedded in payment instrument 1100 and not visible on an exterior of payment instrument 1100. Transceiver 1103 may transmit payment instrument information to a POS terminal.

A POS terminal or a processor (shown in FIG. 7 and FIG. 8) may determine custom reward eligibility or a custom reward for the identified payment instrument. The determined customer may be received by transceiver 1103. Display 1105 may present the custom reward to the customer in possession of payment instrument 1100. Custom rewards presented on display 1105 may be controlled by one or more components of a POS system.

Figure 12:
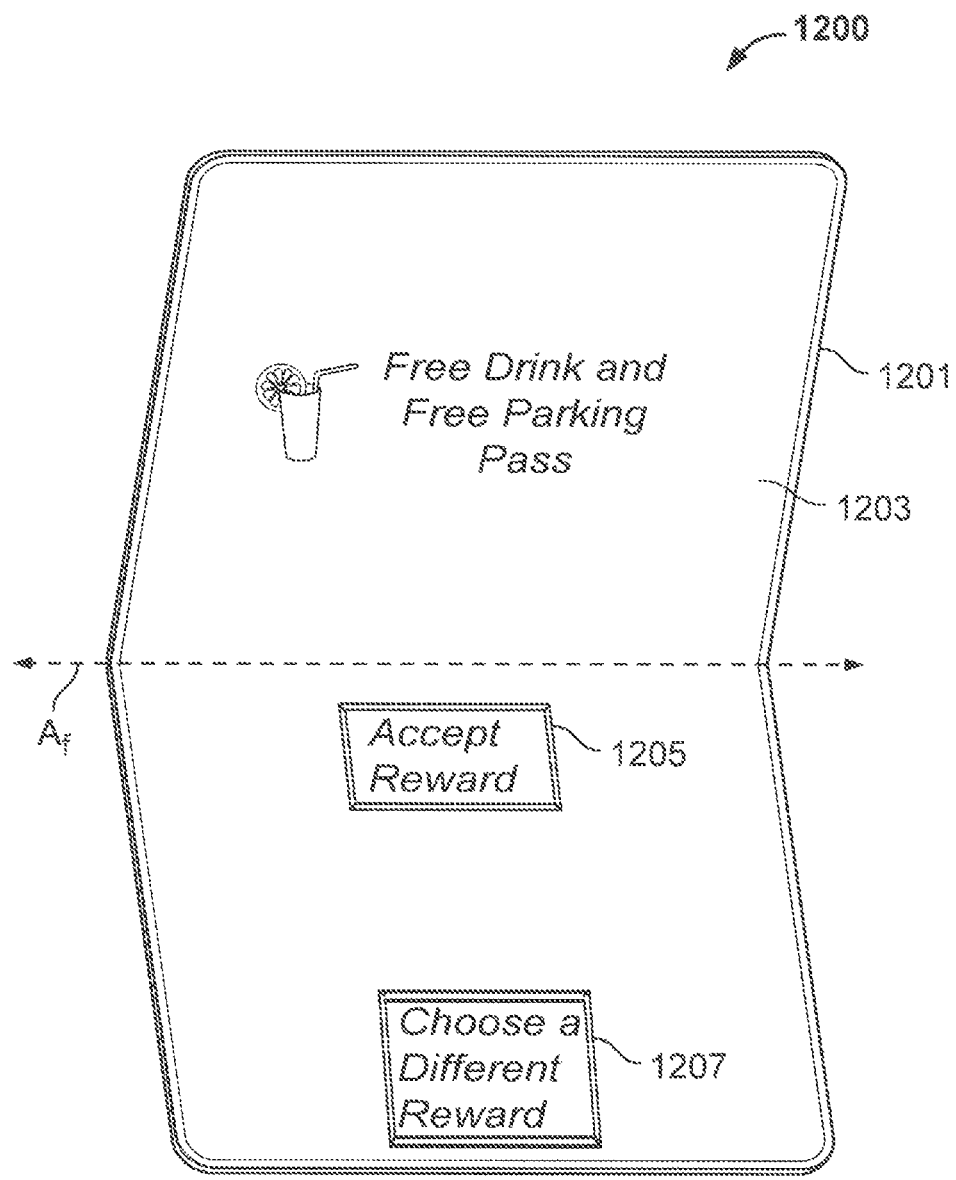
FIG. 12 shows illustrative apparatus in accordance with principles of the disclosure.

FIG. 12 shows illustrative payment instrument 1200. Payment instrument 1200 may include display 1201 constructed using organic light emitting diode ("OLED") technology. OLED technology may enhance functionality of a payment instrument. OLEDs are typically solid-state semiconductors constructed from a thin film of organic material. OLEDs emit light when electricity is applied across the thin film of organic material. Because OLEDs are constructed using organic materials, OLEDs may be safely disposed without excessive harm, to the environment.

Furthermore, OLEDs may be used to construct a display that, consumes less power compared, to other display technologies. For example, in a Liquid Crystal Display, power must be supplied to the entire backlight, even to illuminate one pixel in the display. In contrast, an OLED display does not necessarily include a backlight. Furthermore, in an OLED display, preferably, only the illuminated pixel draws power.

The power efficiency of OLED technology presents a possibility for designing nodes that consume less power for their basic functionality and allow any residual power to provide enhanced security and functionality. Illustrative devices that may be constructed using OLED technology are disclosed in commonly assigned U.S. Pat. No. 9,665,818, which is hereby incorporated by reference herein in its entirety.

FIG. 12 shows illustrative custom reward 1203 presented using OLED display 1201 of payment instrument 1200. OLED display 1201 also presents option 1203. A customer may select option 1203 to accept custom, reward 1201. OLED display 1201 may be touch-sensitive. The customer may select option 1203 by touching an area of OLED display 1201 where option 1203 is displayed.

OLED display 1201 also presents option 1205. A customer may use option 1207 to request an alternative customer reward. When, a customer selects option 1203 or 1205, payment instrument 1200 may communicate with a merchant POS system (e.g., POS systems shown in FIGS. 7 and 8). Payment instrument 1200 may communicate using a wireless transceiver, such as transceiver 1103 (shown in FIG. 11). In response to the request received from payment instrument 1200, the merchant POS system may formulate an alternative merchant funded reward. The alternative reward may be determined based on applying a machine learning algorithm, to identify a reward likely to be desired by the customer, FIG. 12 shows that payment instrument 1200 and its OLED display may be foldable about axis $A_f$. Payment instrument 1200 and its OLED display may also be reliable. Payment instrument 1200, when folded may have a size that is substantially 85.60 mm×53.98 mm×0.8 mm.

Thus, methods and systems for a POS system integrating merchant-based rewards are provided. Persons skilled in the art will appreciate that the present invention can be practiced by other than the described embodiments, which are presented for purposes of illustration rather than of limitation, and that the present disclosure is limited only by the claims that follow.

What is claimed is:

1. A point-of-sale ("POS") system comprising:
    a payment instrument comprising:
        a transceiver; and
        a touch-sensitive, organic light emitting diode ("OLED") display; and
    a POS terminal at a merchant location, the POS terminal comprising a non-transitory computer readable storage media storing a set of executable instructions which, when executed by a processor on the POS terminal, configures the POS terminal to:
        capture transaction data associated with a purchase initiated at the POS terminal, the transaction data comprising a plurality of factual attributes; and
        before submitting the transaction data to an issuer computer system for authorization of the purchase and within a time-sensitive authorization window that begins at a time the transaction data is captured and is less than a total duration of five seconds:
            activate an attribute prediction model and generate at least one predicted attribute, wherein the attribute prediction model comprises a machine learning algorithm that learns based on:
                past transaction data captured by the POS terminal; and
                future transaction data captured by the POS terminal associated with a future purchase;

based on the at least one predicted attribute, determine a set of target customer actions that, for the captured transaction data, is expected to yield a plurality of target attributes associated with the future purchase;

based on a functionality of the POS terminal, formulate a set of machine actions that, when executed by the POS terminal, is expected to induce a threshold number of the customer actions at a future time;

submit the transaction data to the issuer computer system along with confirmation that the set of machine actions have been formulated by the POS terminal; and configure the POS terminal to:

execute the set of machine actions and induce the threshold number of customer actions at the future time by issuing instructions to the transceiver of the payment instruction and thereby presenting, on the OLED display of the payment instrument, a custom reward associated with the future purchase;

wherein, submitting the confirmation to the issuer computer system:

triggers a rebate of a conventional cost of processing the transaction at the POS terminal; and does not exceed strict timing requirements associated with processing electronic payments.

2. The POS terminal of claim 1, the set of executable instructions, when executed by the processor, further configure the POS terminal to:

track captured transaction data over time;

determine a success of achieving the at least one target attribute; and based on the success, in response to capturing transaction data associated with the future purchase, adjust:

the set of target customer actions; and the set of machine actions.

3. The POS terminal of claim 1 wherein the conventional cost comprises an interchange fee set by a transaction processing network.

4. The POS terminal of claim 1 wherein the set of machine actions comprise determining and presenting the custom reward on the OLED display such that the custom reward is:

exclusively linked to one or more products or services offered at the merchant location; and determined such that a value of the custom reward is at least as great as a value of the rebate of the conventional cost.

5. The POS terminal of claim 4 wherein the value of the custom reward is greater than the value of the rebate of the conventional cost.

6. The POS terminal of claim 1 wherein authorization for the captured transaction data and rebate of the conventional cost occur before the POS terminal executes the set of machine actions.

7. The POS terminal of claim 4 wherein the set of machine actions comprise, configuring the POS terminal to provide a bonus product when the POS terminal captures transaction data associated with the future purchase.

8. The POS terminal of claim 7 wherein the set of machine actions comprise configuring the POS terminal to identify the bonus product based on proximity of the bonus product to the POS terminal.

9. The POS terminal of claim 1 wherein the POS terminal is one of a plurality of POS terminals in operation at the merchant location, and the attribute prediction model is configured to determine a threshold number of the target attributes based on transaction data received from each of the plurality of POS terminals.

* * * * *